United States Patent
Haupt et al.

(10) Patent No.: US 8,858,387 B2
(45) Date of Patent: Oct. 14, 2014

(54) MULTI-STAGE TRANSMISSION

(75) Inventors: Josef Haupt, Tettnang (DE); Martin Brehmer, Tettnang (DE); Gabor Diosi, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 398 days.

(21) Appl. No.: 13/144,524

(22) PCT Filed: Feb. 26, 2010

(86) PCT No.: PCT/EP2010/052489
§ 371 (c)(1),
(2), (4) Date: Jul. 14, 2011

(87) PCT Pub. No.: WO2010/100090
PCT Pub. Date: Sep. 10, 2010

(65) Prior Publication Data
US 2011/0306460 A1   Dec. 15, 2011

(30) Foreign Application Priority Data
Mar. 2, 2009 (DE) .......... 10 2009 001 253

(51) Int. Cl.
*F16H 3/78* (2006.01)
*F16H 3/66* (2006.01)
(52) U.S. Cl.
CPC .......... *F16H 3/66* (2013.01); *F16H 2200/2046* (2013.01); *F16H 2200/0065* (2013.01); *F16H 2200/2012* (2013.01)
USPC .......................................... 475/282; 475/303
(58) Field of Classification Search
USPC ........................................ 192/271, 296, 330
See application file for complete search history.

(56) References Cited

U.S. PATENT DOCUMENTS

| | | | |
|---|---|---|---|
| 7,335,127 B2 * | 2/2008 | Tiesler et al. | 475/284 |
| 7,575,533 B2 | 8/2009 | Gumpoltsberger | |
| 7,789,792 B2 | 9/2010 | Kamm et al. | |
| 7,931,556 B2 | 4/2011 | Diosi et al. | |
| 2005/0187060 A1 * | 8/2005 | Bauknecht et al. | 475/159 |
| 2007/0202983 A1 * | 8/2007 | Gumpoltsberger | 475/278 |
| 2007/0275812 A1 * | 11/2007 | Tiesler et al. | 475/275 |
| 2008/0015081 A1 * | 1/2008 | Kamm et al. | 475/276 |
| 2009/0054196 A1 | 2/2009 | Phillips et al. | |

FOREIGN PATENT DOCUMENTS

| | | |
|---|---|---|
| DE | 10 2005 031 066 A1 | 2/2007 |
| DE | 10 2006 006 639 A1 | 8/2007 |
| WO | 2006/074707 A1 | 7/2006 |

* cited by examiner

*Primary Examiner* — Troy Chambers
*Assistant Examiner* — Ryan Dodd
(74) *Attorney, Agent, or Firm* — Davis & Bujold, PLLC; Michael J. Bujold

(57) ABSTRACT

A transmission with nine forward and one reverse gear comprises planetary gearsets, shafts and shift elements. A sun gear of a first gearset (P1) is connectable to a housing via a first brake (03) and couples the sun gear of the second gearset (P2). A carrier of the first gearset (P1) couples the ring gear of the fourth gearset (P4). A ring gear of first gearset (P1) is connectable to the housing by a second brake (04). The carrier of the second gearset (P2) couples the input which is connectable by clutch (15) to the fifth shaft (5). The fifth shaft (5) respectively couples the sun and ring gears of the fourth and third gearsets (P4, P3) and is connectable to a seventh shaft (7) by clutch (57). The seventh shaft (7) respectively couples the sun and ring gears of the third and the second gearsets (P3, P2). Output shaft couples the carrier of the fourth gearset (P4) and, via clutch (28), the eight shaft (8) which is connected to the carrier of the third gearset (P3), and clutch (18) couples the eight shaft (8) to the input.

21 Claims, 16 Drawing Sheets

|  | 03 | 04 | 15 | 28 | 57 | 18 | i | phi |
|---|---|---|---|---|---|---|---|---|
| 1. GEAR | x | x |  |  |  | x | 6.812 | 1.451 |
| 2. GEAR | x | x | x |  |  |  | 4.695 | 1.500 |
| 3. GEAR | x | x |  |  | x |  | 3.131 | 1.488 |
| 4. GEAR |  | x | x | x | x |  | 2.104 | 1.262 |
| 5. GEAR |  |  | x | x | x |  | 1.667 | 1.298 |
| 6. GEAR |  | x | x | x |  |  | 1.285 | 1.285 |
| 7. GEAR |  |  |  | x | x |  | 1.000 | 1.192 |
| 8. GEAR | x |  |  |  |  |  | 0.839 | 1.259 |
| 9. GEAR | x |  |  |  |  |  | 0.667 | 10.218 |
| R. GEAR | x | x |  | x |  |  | -3.297 | -0.484 |

Fig.15

MULTI-STAGE TRANSMISSION

This application is a National Stage completion of PCT/EP2010/052489 filed Feb. 26, 2010, which claims priority from German patent application serial no. 10 2009 001 253.2 filed Mar. 2, 2009.

FIELD OF THE INVENTION

The present invention concerns a multi-stage transmission of planetary design, in particular an automatic transmission for a motor vehicle.

BACKGROUND OF THE INVENTION

According to the prior art automatic transmissions, especially those for motor vehicles, comprise planetary gear sets which are shifted by means of frictional or shift elements such as clutches and brakes, and are usually connected to a starting element that is liable to slip and is optionally provided with a bridging clutch, such as a hydrodynamic torque converter or a flow clutch.

In general, vehicle transmissions of planetary structure have already been described many times in the prior art and undergo continual further development and improvement. Such transmissions should demand little construction effort and expenditure, in particular a small number of shift elements, and should avoid double shifts when operated in a sequential shift mode so that during shifts in defined gear groups, in each case only one shift element is changed, i.e. to shift from one gear to the respective next-higher or next-lower gear, in each case only one of the shift elements engaged at the time has to be disengaged and only one of the shift elements disengaged at the time has to be engaged.

For example, an automatic transmission of that type is known from WO 2006/074707 A1 by the present applicant. This multi-stage transmission of planetary design comprises a drive input shaft, a drive output shaft, four planetary gear sets, at least eight rotating shafts and five shift elements, preferably two brakes and three clutches, such that a carrier of the fourth planetary gear set and the drive input shaft are connected in a rotationally fixed manner to one another and form the first rotating shaft of the transmission, and such that a carrier of the third planetary gear set and the drive output shaft are connected in a rotationally fixed manner to one another and form the second rotating shaft of the transmission. Furthermore, a sun gear of the first planetary gear set and a sun gear of the fourth planetary gear set are connected in a rotationally fixed manner to one another and form the third rotating shaft of the transmission, and a ring gear of the first planetary gear set forms the fourth rotating shaft of the transmission. Further, a ring gear of the second planetary gear set and a sun gear of the third planetary gear set are connected in a rotationally fixed manner to one another and form the fifth rotating shaft of the transmission, a carrier of the first planetary gear set and a ring gear of the third planetary gear set are connected in a rotationally fixed manner to one another and form the sixth rotating shaft of the transmission, and a sun gear of the second planetary gear set and a ring gear of the fourth planetary gear set are connected in a rotationally fixed manner to one another and form the seventh rotating shaft of the transmission; the eighth rotating shaft of the transmission is formed by a carrier of the second planetary gear set. With a transmission designed in this way eight forward gears and one reverse gear can be obtained.

Regarding the connection of the five shift elements to the various elements of the planetary gear sets and to the drive input shaft of the transmission, according to WO 2006/074707 A1 it is proposed that the first shift element is arranged in the force flow between the third shaft and a housing of the transmission, the second shift element is arranged in the force flow between the fourth shaft and the transmission housing, and the third shift element is arranged in the force flow between the fifth and the first shafts. Furthermore, the fourth shift element is arranged in the force flow between the eighth and the second shafts or, however, between the eighth and the sixth shafts, whereas the fifth shift element is arranged in the force flow either between the seventh and the fifth shafts, or between the fifth and the eighth shafts. By virtue of these various kinematic couplings of the shift elements to the various shafts of the transmission an entire transmission family is obtained.

SUMMARY OF THE INVENTION

Starting from an eight-gear transmission according to WO 2006/074707 A1 by the present applicant, the complete content of which is incorporated by reference, the purpose of the present invention is to provide a multi-stage transmission with at least nine forward gears and at least one reverse gear having a sufficient gear ratio, such that the gear ratio of the first forward gear should be higher than the gear ratio of the first gear of the transmission known from WO 2006/074707 A1.

Accordingly, according to the invention a multi-stage transmission of planetary design is proposed, which comprises a drive input and a drive output arranged in a housing. Furthermore at least four planetary gear sets, preferably designed as minus planetary gear sets and denoted in what follows as the first, second, third and fourth planetary gear sets, at least eight rotating shafts—denoted in what follows as the drive input shaft, the drive output shaft and the third, fourth, fifth, sixth, seventh and eighth shafts, and at least six shift elements, including both brakes and clutches are provided, whose selective engagement produces various transmission gear ratios between the drive input and the drive output, so that preferably nine forward gears and a reverse gear can be obtained.

As is known, a simple minus planetary gear set comprises a sun gear, a ring gear and a carrier on which planetary gearwheels are mounted to rotate, each meshing with the sun gear and the ring gear. Because of this, when the carrier is held fixed the ring gear rotates in the opposite direction to the sun gear. In contrast, a simple plus planetary gear set has a sun gear, a ring gear and a carrier on which inner and outer planetary gears are mounted to rotate, all the inner planetary gears meshing with the sun gear and all the outer planetary gears with the ring gear, such that each inner planetary gear meshes with a respective outer planetary gear. Because of this, when the carrier is held fixed the ring gear rotates in the same direction as the sun gear.

In this case it is provided that the sun gear of the first planetary gear set is connected to the third shaft, which can be coupled by a first brake to a housing of the transmission and is connected in a rotationally fixed manner to the sun gear of the second planetary gear set, the carrier of the first planetary gear set is connected to the sixth shaft itself being connected to the ring gear of the fourth planetary gear set, and the ring gear of the first planetary gear set can be coupled by a second brake to a housing of the transmission.

Further, the carrier of the second planetary gear set is connected to the drive input shaft, which can be releasably connected by a first clutch to the fifth shaft, and the fifth shaft is connected to the sun gear of the fourth planetary gear set and the ring gear of the third planetary gear set, and can be connected releasably to the seventh shaft by a second clutch. The seventh shaft is connected to the sun gear of the third planetary gear set and the ring gear of the second planetary gear set. In addition the drive output shaft is connected to the carrier of the fourth planetary gear set and can be connected releasably by a third clutch to the eighth shaft, itself being connected to the carrier of the third planetary gear set.

According to the present invention the transmission known from WO 2006/074707 A1 is extended by a fourth clutch which connects the eighth shaft releasably to the drive input shaft, which provides a transmission with at least nine forward gears and at least one reverse gear, in which the gear ratio of the first forward gear is higher than the gear ratio of the first gear of the transmission known from WO 2006/074707 A1.

According to the invention the additional shift element that connects the drive input shaft releasably to the eighth shaft can be in the form of a disk clutch or an interlock-type shift element or claw clutch. The claw clutch version is possible in the case when the shift element is disengaged during upshifts.

When the additional clutch is a disk clutch, according to a preferred embodiment of the invention it is proposed to arrange the clutch directly adjacent to the planetary carrier of a planetary gear set, preferably the second planetary gear set, and to supply it with pressure medium through a bore in the drive input shaft and the planetary carrier, in the manner known from DE 2005031066 A1 by the present applicant.

By virtue of the design of the multi-stage transmission according to the invention, particularly for passenger cars, suitable gear ratios are obtained, as well as a substantial increase of the overall spread of the multi-stage transmission, which improves the driving comfort and reduces fuel consumption significantly.

Moreover, with the multi-stage transmission according to the invention the small number of shift elements substantially reduces the structural complexity. Advantageously, with the multi-stage transmission according to the invention, starting can be carried out with a hydrodynamic converter, an external starting clutch or even with other suitable external starting elements. It is also conceivable to enable a starting process with a starting element integrated in the transmission. Preferably, a shift element that is actuated in the first forward gear and in the reverse gear is appropriate.

Furthermore, with the multi-stage transmission according to the invention good efficiency is obtained in the main driving gears in relation to drag losses and gearing losses.

Further, in the multi-stage transmission low torques are involved in the shift elements and planetary gear sets, and this advantageously reduces wear in the multi-stage transmission. Moreover, the low torques enable the dimensions to be made correspondingly smaller so that the structural space required and the corresponding costs are reduced. Moreover, the rotation speeds of the shift elements and planetary gear sets are also low.

Besides, the transmission according to the invention is designed in such manner that it can be adapted to various drivetrain designs, both in the force flow direction, and in relation to fitting space.

BRIEF DESCRIPTION OF THE DRAWINGS

Below, examples of the invention are explained in more detail with reference to the attached figures, which show:

FIG. 7, 7A: Detailed view of the system according to FIG. 6 for actuating the additional shift element, in the disengaged and engaged conditions of the shift element;

FIG. 15: Example shifting scheme for a multi-stage transmission according to FIGS. 1, 2, 3, 4 and 5.

DETAILED DESCRIPTION OF THE PREFERRED EMBODIMENTS

Figure 1:
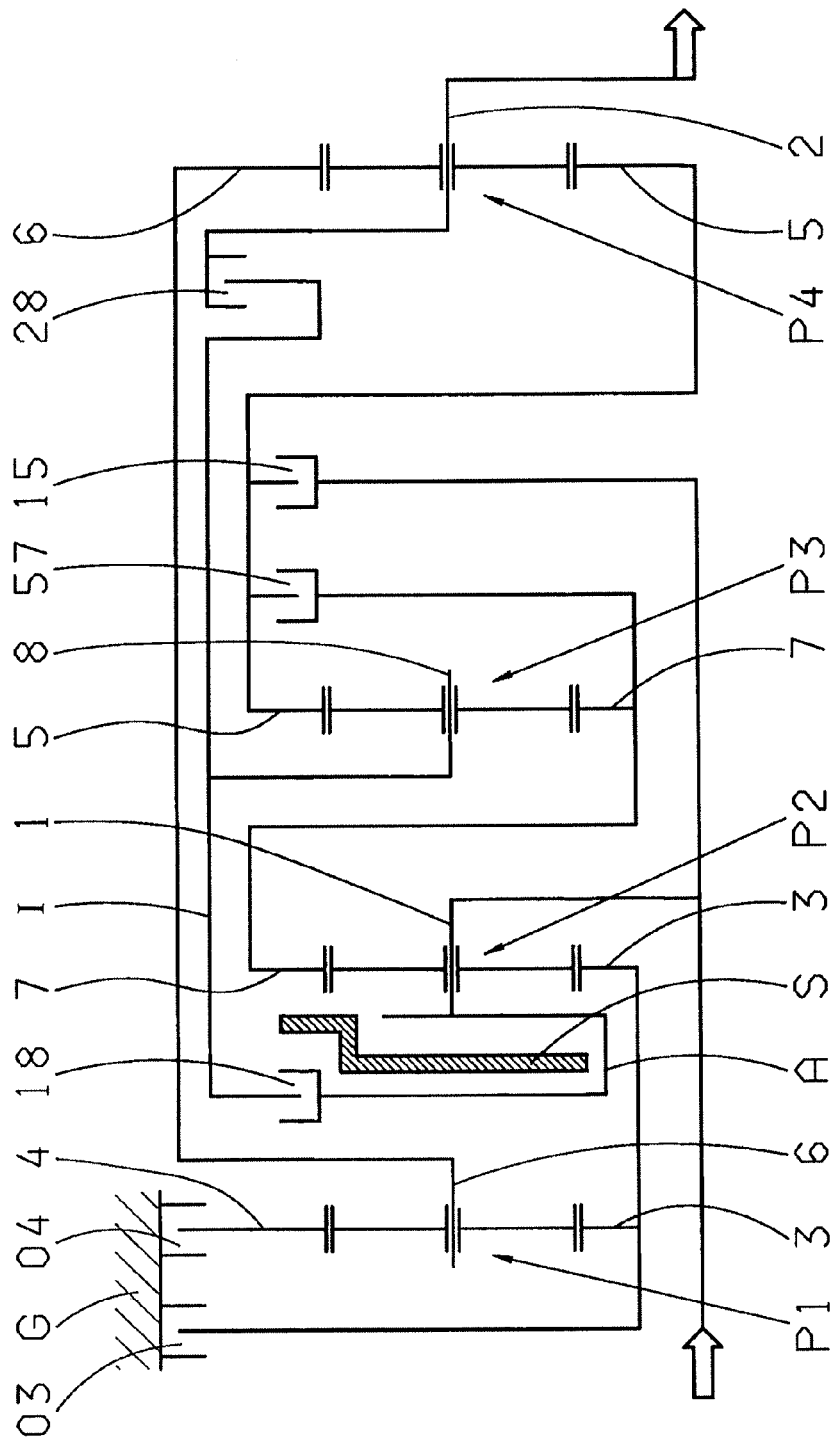
FIG. 1: Schematic view of a preferred embodiment of a multi-stage transmission according to the invention.

FIG. 1 shows a multi-stage transmission according to the invention with a drive input shaft 1, a drive output shaft 2 and four planetary gear sets P1, P2, P3, P4 arranged in a housing G. The four planetary gear sets P1, P2, P3, P4 are designed as minus planetary gear sets.

In the example embodiment shown, as viewed axially the planetary gear sets P1, P2, P3, P4. are arranged in the sequence P1, P2, P3, P4.

As can be seen in FIG. 1 six shift elements are provided, namely two brakes 03, 04 and four clutches 15, 18, 28 and 57. The shift elements can be spatially arranged in any desired manner, limited only by their dimensions and external shape.

The brakes 03 and 04 are preferably made as friction-engaging disk brakes; in other designs they could also be friction-engaging band brakes or, for example, even interlock-engaging claw or cone brakes. Furthermore, the clutches 15, 28 and 57 are preferably friction-engaging disk clutches;

in other designs, however, they could also for example be interlock-engaging claw or cone clutches.

With these shift elements a selective engagement of nine forward gears and one reverse gear can be obtained. The multi-stage transmission according to the invention comprises a total of eight rotating shafts, namely shafts 1, 2, 3, 4, 5, 6, 7 and 8, the drive input shaft being the first, and the drive output shaft the second shaft of the transmission.

According to the invention, in the multi-stage transmission according to FIG. 1 it is provided that the sun gear of the first planetary gear set P1 is connected to the third shaft 3, which can be coupled by a first brake 03 to a housing G of the transmission and is connected in a rotationally fixed manner to the sun gear of the second planetary gear set P2, the carrier of the first planetary gear set P1 is connected to the sixth shaft 6, itself connected to the ring gear of the fourth planetary gear set P4, and the ring gear of the first planetary gear set P1 can be coupled by a second brake 04 to a housing G of the transmission.

As can be seen from FIG. 1, the carrier of the second planetary gear set P2 is connected to the drive input shaft 1, which can be connected releasably by a first clutch 15 to the fifth shaft 5, whereas the fifth shaft 5 is connected to the sun gear of the fourth planetary gear set P4 and the ring gear of the third planetary gear set P3, and can be connected releasably by a second clutch 57 to the seventh shaft 7. In turn, the seventh shaft 7 is connected to the sun gear of the third planetary gear set P3 and the ring gear of the second planetary gear set P2. Further, the drive output shaft 2 is connected to the carrier of the fourth planetary gear set P4 and, by a third clutch 28, can be connected releasably to the eighth shaft 8 which is connected to the carrier of the third planetary gear set P3.

According to the invention the transmission known from WO 2006/074707 A1 is extended by a fourth clutch 18 which connects the eighth shaft 8 releasably to the drive input shaft 1, thus providing a transmission with at least nine forward gears and at least one reverse gear.

In the example shown the fourth clutch 18 is made as a friction-engaging disk clutch and, viewed axially, is arranged between the first planetary gear set P1 and the second planetary gear set P2, so that it is adjacent to the second planetary gear set P2. The inner disk carrier I of the clutch 18 forms a section of the shaft 8 and its outer disk carrier A is connected to the carrier of the second planetary gear set.

Preferably, pressure medium is supplied to the servomechanism S associated with the clutch 18 which, viewed axially, is arranged within the cylindrical space formed by the outer disk carrier A directly adjacent to the carrier of the second planetary gear set P2 between the first and second planetary gear sets P1, P2 and which rotates with the speed of the drive input shaft 1, via a bore in the planetary carrier or carrier of the second planetary gear set P2 and a bore in the drive input shaft 1 connected in a rotationally fixed manner to the carrier of the second planetary gear set P2. Thereby, in an advantageous manner, only one rotary pressure medium transfer is needed. Here, the outer disk carrier A rotates at the speed of the drive input shaft 1.

As described in WO 2006/074707 A1, as viewed axially the brakes 03 and 04 are arranged at least substantially next to one another and, as viewed radially, can be arranged one over the other with the brake 04 closer to the first planetary gear set P1 than is the brake 03. In the case when the brakes 03, 04 are disk brakes, the disk packets of both brakes are arranged directly adjacent to the first planetary gear set P1, and the servomechanisms that act upon the disk packets can be arranged on the side of the respective disk packet that faces away from the first planetary gear set P1.

Furthermore, the outer disk carriers of the brakes 03, 04 can be integrated in a housing wall G and the servomechanisms of the two brakes can be mounted axially movably in this housing wall so that, to engage the respective brake 03 or 04, they actuate their respectively associated disk packet axially in the direction of the planetary gear sets; the necessary pressure medium is preferably supplied to the servomechanisms via corresponding ducts at least part of which run inside the housing wall G.

Further and in accordance with WO 2006/074707 A1, as viewed axially the three clutches 57, 15 and 28 are arranged in an area between the third planetary gear set P3 and the fourth planetary gear set P4, in such manner that viewed axially the clutch 15 is between the two clutches 57 and 28, the clutch 57 is axially adjacent to the third planetary gear set P3 and the clutch 28 is axially adjacent to the fourth planetary gear set P4. The clutches 15 and 57 can share a common inner disk carrier.

Figure 2:
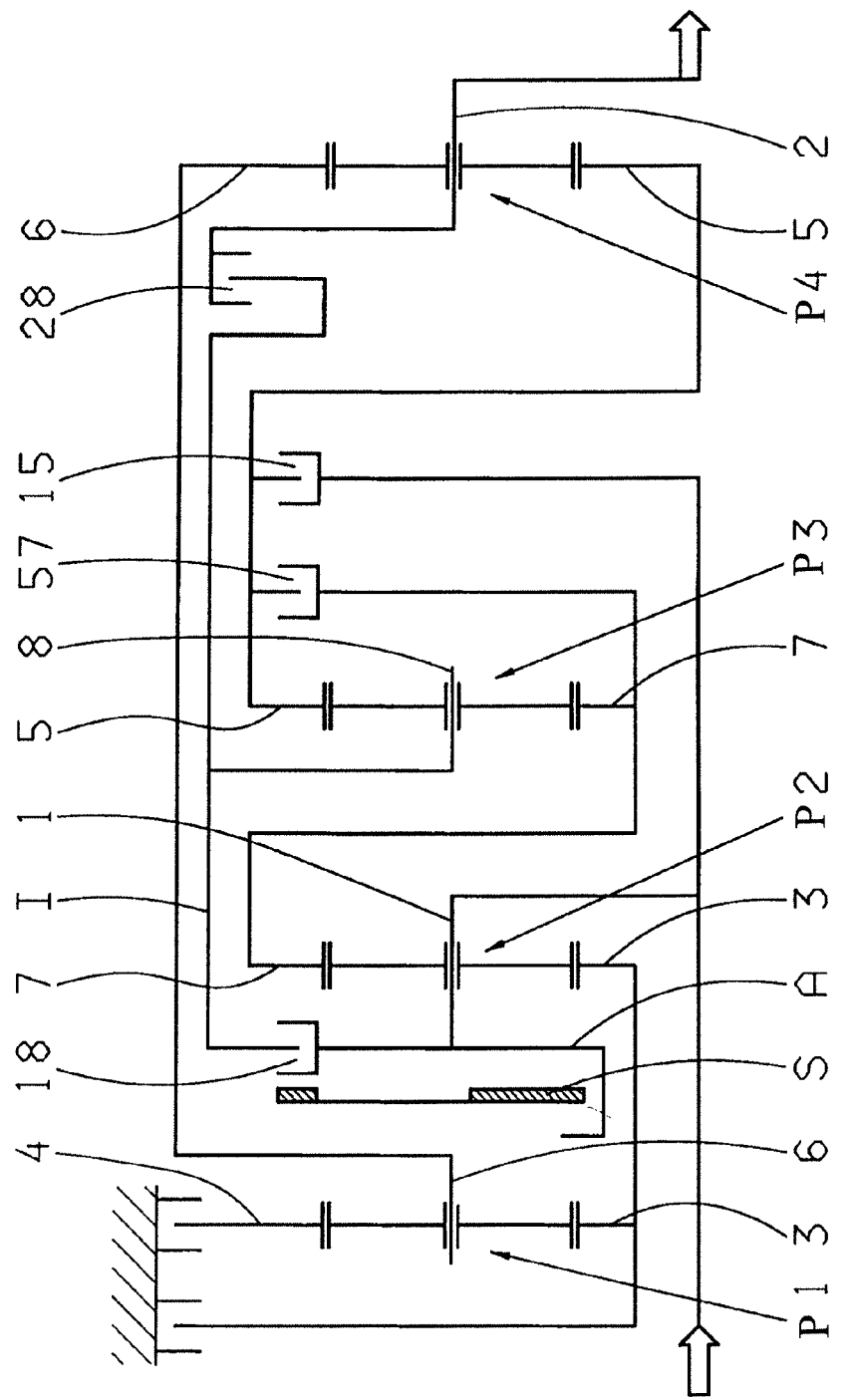
FIG. 2: Schematic view of a second preferred embodiment of a multi-stage transmission.

The example embodiment of an automatic transmission according to the invention shown in FIG. 2 differs from that shown in FIG. 1, in that the outer disk carrier A of the clutch 18 is not directly adjacent to the carrier of the second planetary gear set P2, so the cylindrical space formed by the outer disk carrier A, viewed axially, is arranged between the first planetary gear set P1 and the second planetary gear set P2; pressure medium is supplied to the servomechanism S, which is partially inside the cylindrical space, via a bore in the third shaft 3.

Figure 3:
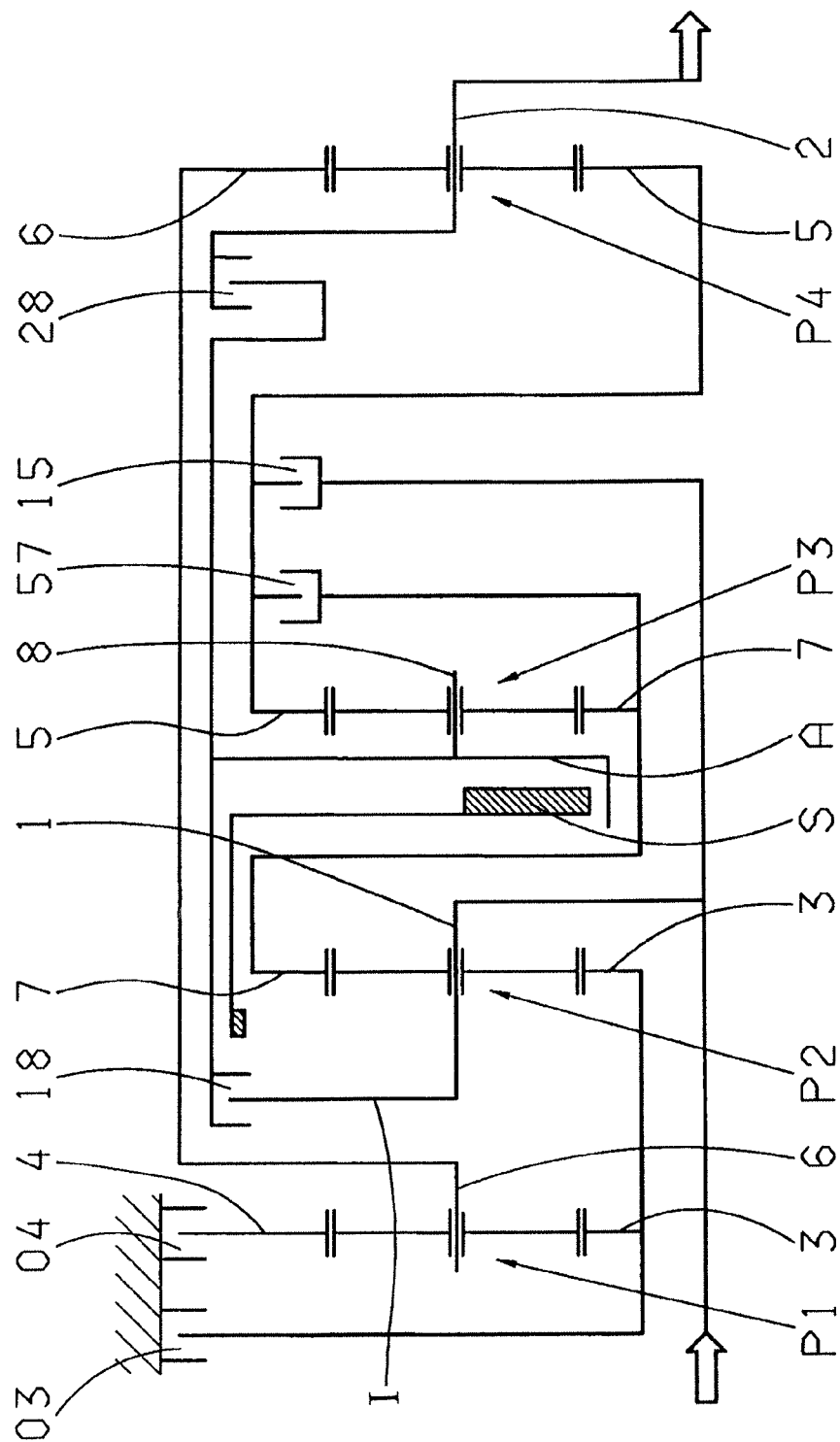
FIG. 3: Schematic view of a third preferred embodiment of a multi-stage transmission according to the invention.

FIG. 3 shows another example embodiment in which, as viewed axially, the clutch 18 is arranged between the first and second planetary gear sets P1, P2 and, in contrast to the examples in FIGS. 1 and 2, the inner disk carrier I of the clutch 18 forms a section of the drive input shaft 1 and the outer disk carrier is connected to the carrier of the third planetary gear set P3 and consequently rotates at the speed of the eighth shaft 8. In this case pressure medium is preferably supplied to the servomechanism S also rotating at the speed of the eighth shaft 8 via a bore in the drive input shaft 1 and in the seventh shaft 7. Viewed axially, the servomechanism S is arranged between the second and third planetary gear sets P2, P3.

Figure 4:
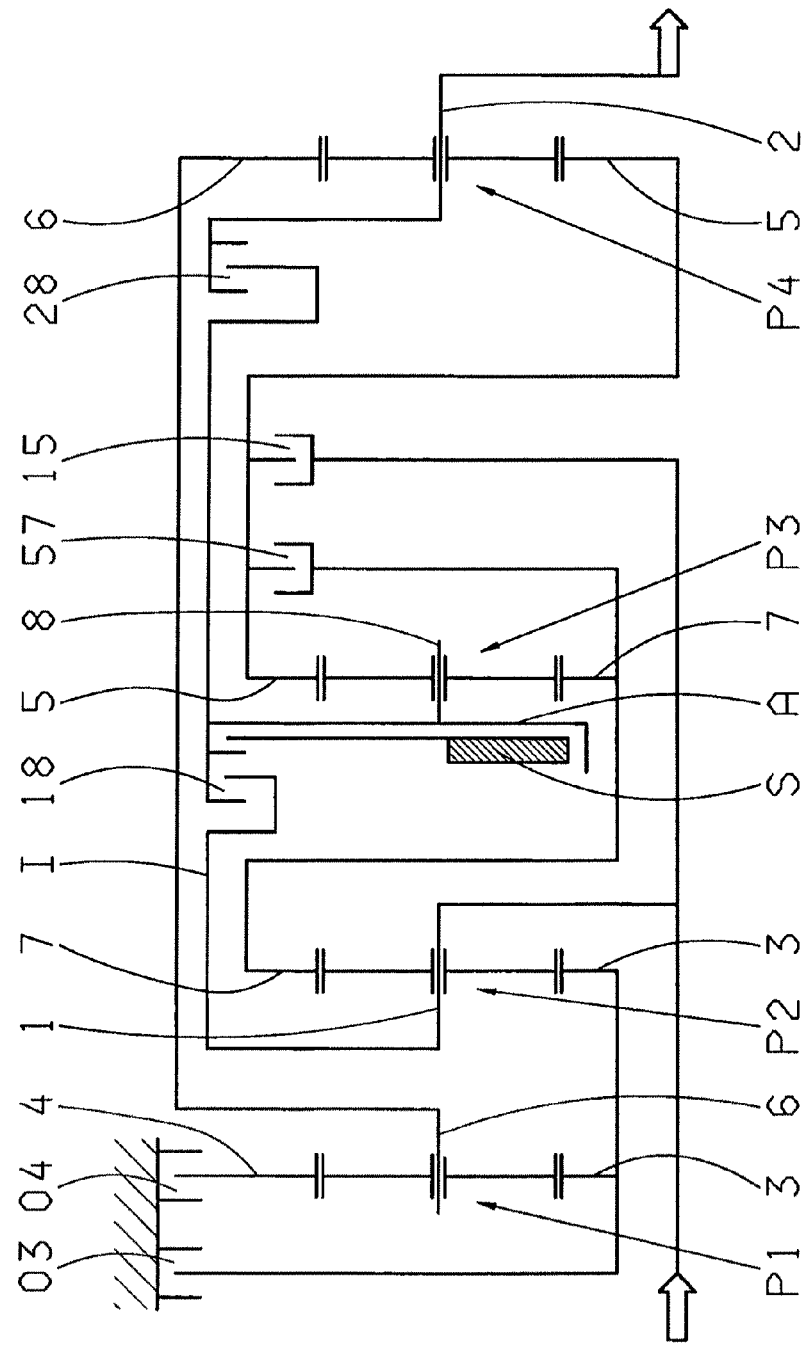
FIG. 4: Schematic view of a fourth preferred embodiment of a multi-stage transmission according to the invention.

The example embodiment shown in FIG. 4 differs from that shown in FIG. 3 in that, viewed axially, the clutch 18 is arranged between the second and third planetary gear sets P2, P3 and, viewed radially, a section of the inner disk carrier I of the clutch 18 extends over the second planetary gear set P2. Analogously to the example embodiment shown in FIG. 3, pressure medium is preferably supplied to the servomechanism S rotating at the same speed as the eighth shaft 8 via a bore in the drive input shaft 1 and in the seventh shaft 7.

Figure 5:
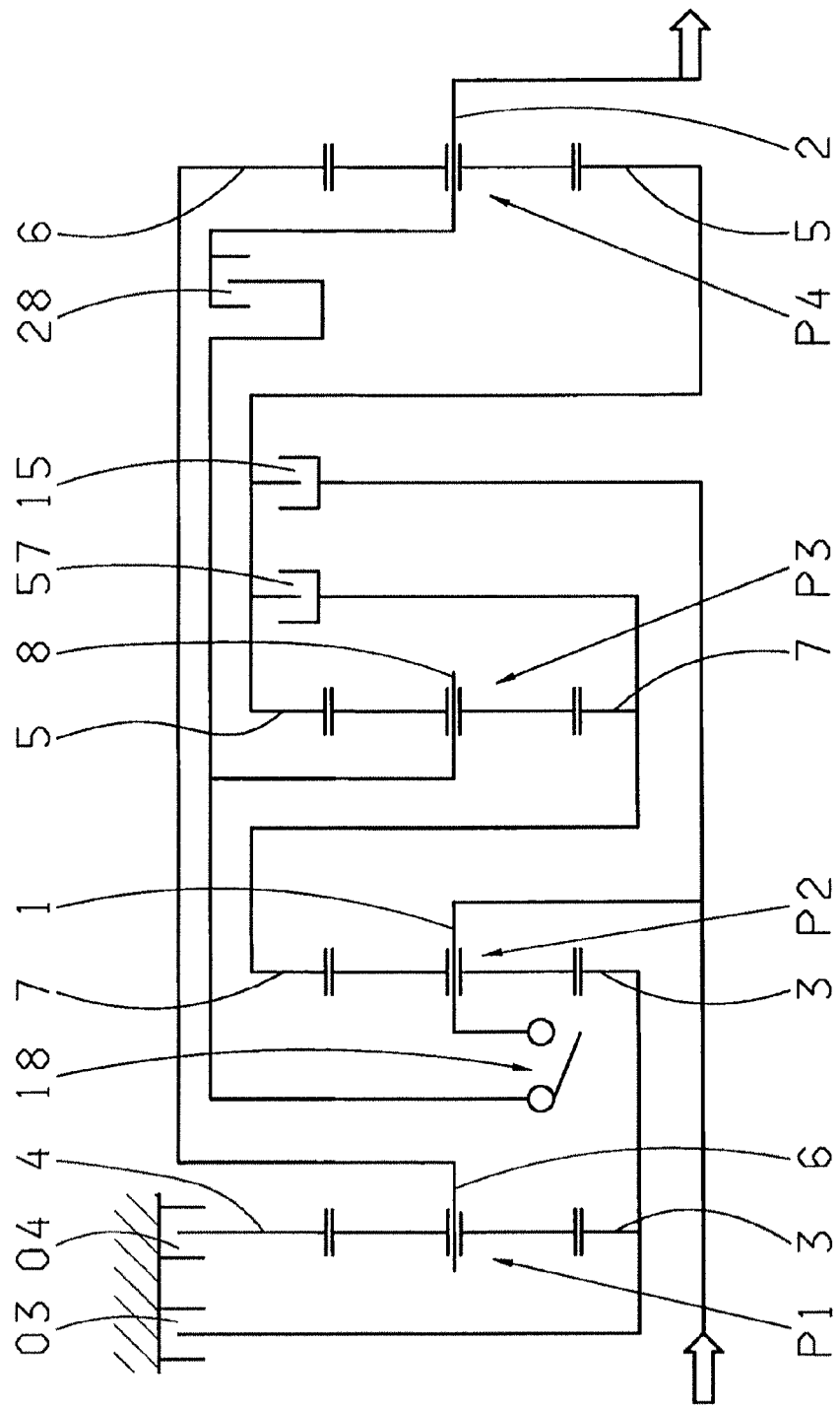
FIG. 5: Schematic view of a fifth preferred embodiment of a multi-stage transmission according to the invention.

According to the invention and with reference to FIG. 5, the clutch 18 can be made as an interlocking shift element or claw clutch. Preferably, the clutch 18 made as a claw clutch can be actuated hydraulically, as described for example in the context of U.S. Pat. No. 5,667,330. Viewed axially, the clutch 18 made as a claw clutch can be arranged between the first and second planetary gear sets P1, P2 or between the second and third planetary gear sets P2, P3.

The condition for making the fourth clutch 18 as a claw clutch is that the clutch 18 is always disengaged during upshifts. Preferably, the clutch 18 is only needed in the first forward gear.

According to the invention, the pressure medium for the clutch 18 made as a claw clutch can be supplied by the transmission roller, as explained below with reference to FIGS. 6 and 7; in what follows, only the components that are relevant to the invention are described and explained.

Figure 6:
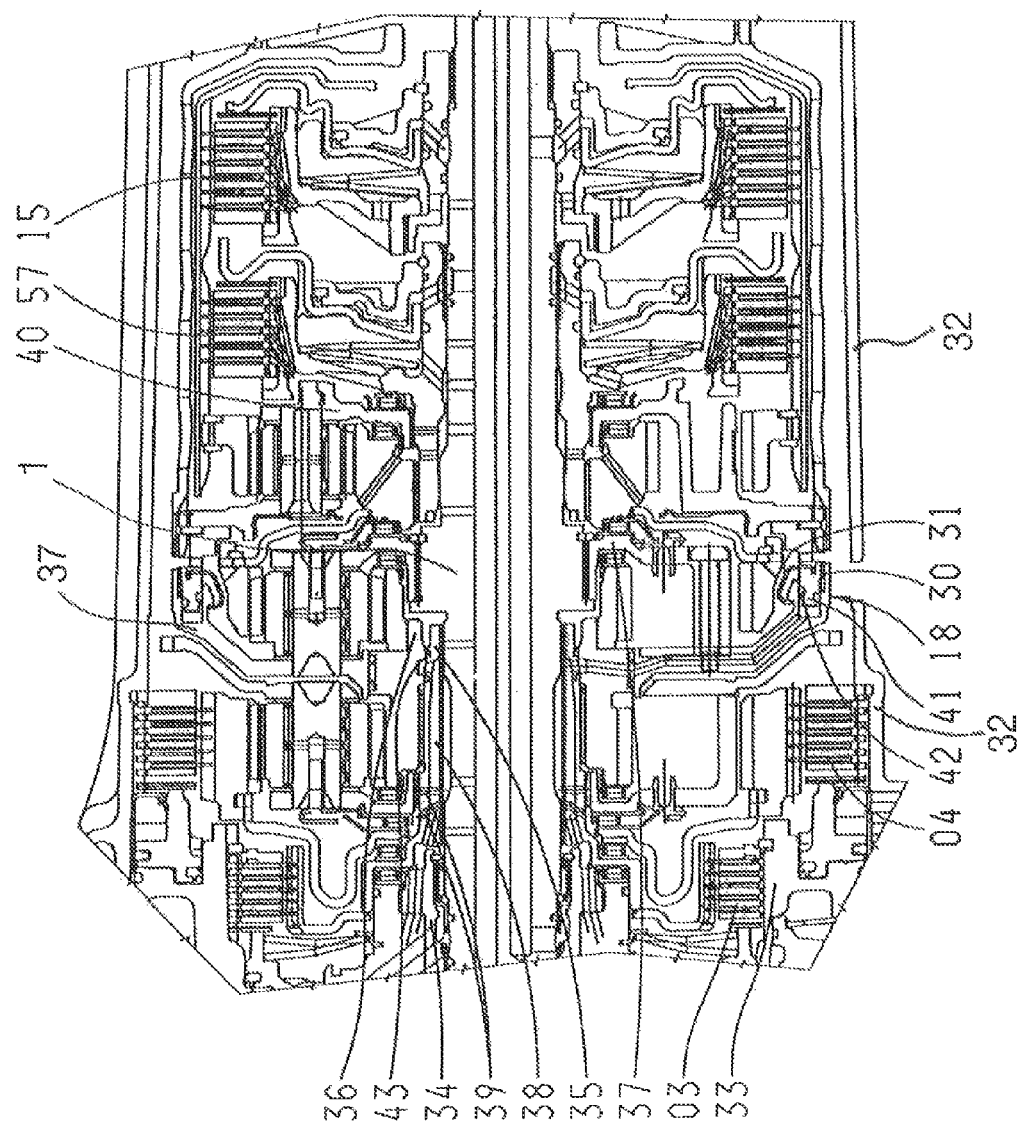
FIG. 6: Schematic view of a design of the system for actuating the additional shift element in a multi-stage transmission made as in FIG. 5.
Figure 7:
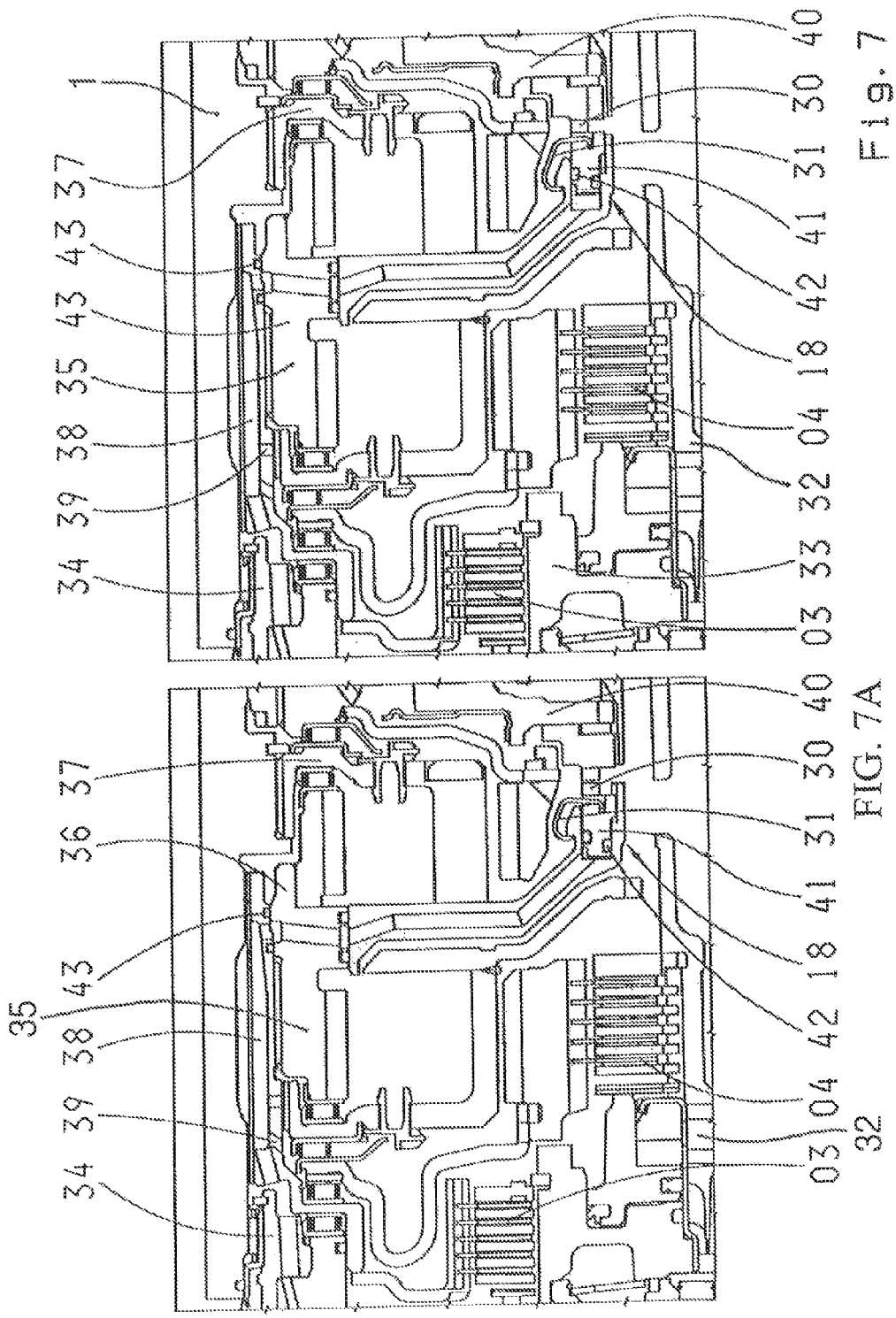

FIG. 6 shows a schematic sectioned view of part of a transmission according to the invention; in FIG. 7A the clutch 18 is shown in its disengaged condition and in FIG. 7 in its engaged condition.

The clutch 18 comprises a piston 41, sliding teeth 30 and at least one return spring 31 that serves to restore the piston. Alternatively to the at least one return spring the piston 41 can be restored by means of a suitable hydraulic device.

The pressure medium is supplied via the shifting unit 32, the intermediate plate 33, the guide wheel shaft 34, the sun gear shaft 35, the sun gear 36 of the second planetary gear set P2 and the carrier of the second planetary gear set P2, with the pressure medium feed in the sun gear shaft 35 taking place via bores 39 and longitudinal grooves 38. In FIGS. 6, 7 and 7A the carrier of the third planetary gear set is indexed 40, and this can be connected releasably to the carrier 37 of the second planetary gear set by means of the clutch 18, the drive input shaft 1 and the eighth shaft 8.

According to the invention, a rectangular ring seal can be provided in each case between the sun gear shaft 35 and the intermediate plate 33, between the idler wheel shaft 34 and the drive input shaft, and between the sun gear 36 and the carrier 37. Further, O-ring seals 42 and 43 can be provided respectively on the piston 41 for actuating the clutch 18 and between the sun gear shaft 35 and the sun gear 26.

In a further embodiment of the invention, the clutch 18 made as a claw clutch can be actuated from the transmission housing G by means of the pot formed by a section of the sixth shaft 6. In this case the control movement can be transmitted to the claw clutch by means of slide blocks actively connected on the one hand to the piston for actuating the clutch 18 and on the other hand to the axially displaceable claw of the clutch 18, as illustrated in FIGS. 8 and 9.

Figure 8:
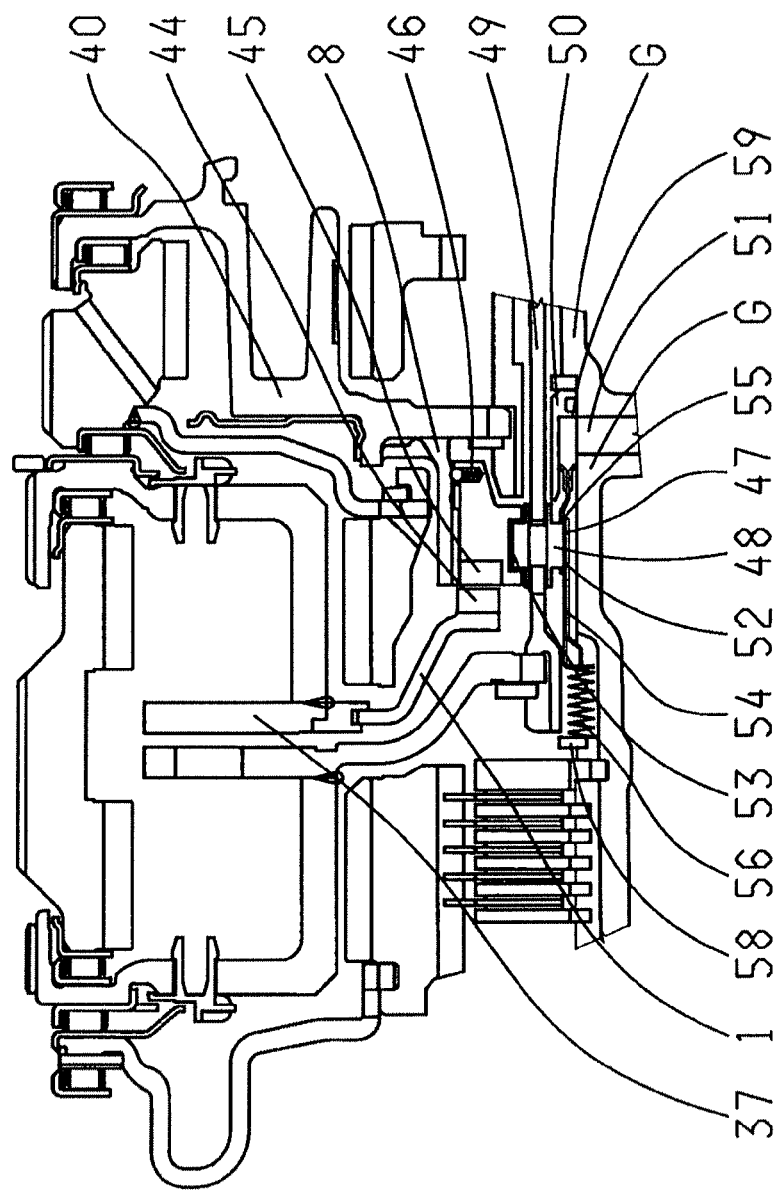
FIG. 8: Schematic view of another design of the system for actuating the additional shift element in a multi-stage transmission made as in FIG. 5, the shift element being shown in the disengaged condition.
Figure 9:
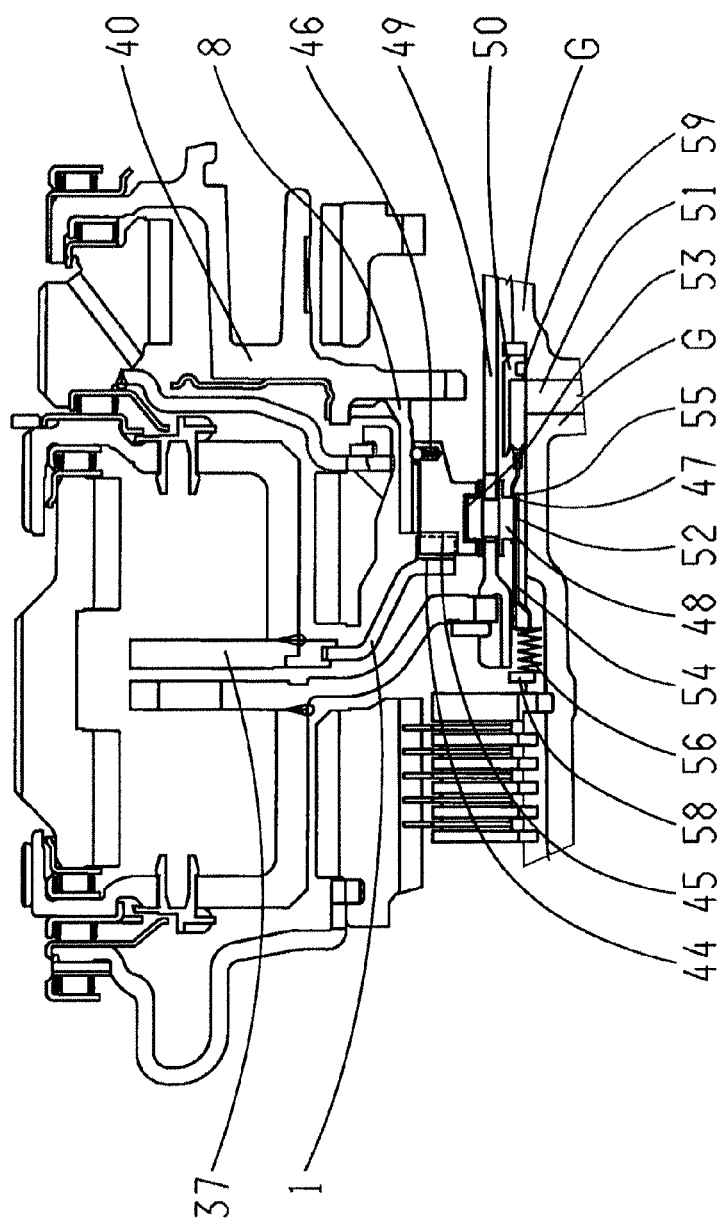
FIG. 9: Schematic view of the design of the system shown in FIG. 8 for actuating the additional shift element, the shift element being shown in the engaged condition.

In FIG. 8 the claw clutch 18 is shown in its disengaged condition. It comprises two claws 44, 45, one claw 44 being associated with the drive input shaft 1 connected in a rotationally fixed manner to the carrier 37 of the second planetary gear set P2 and the other claw 45 with the eighth shaft 8 connected in a rotationally fixed manner to the carrier 40 of the third planetary gear set P3. The claw 45 is arranged axially movably on the eighth shaft 8 and can be held in two positions by means of a spring-and-ball detaining device 46 and corresponding retaining grooves, these positions corresponding to the disengaged and engaged conditions of the clutch 18.

To actuate the clutch 18 an axially displaceable ring piston 47 is provided, the pressure space of the ring piston being formed by a ring cylinder 50 and the transmission housing G, with a bore 51 provided in the transmission housing G for supplying the pressure medium.

In addition, to transmit the control movement a plurality of slide blocks 48, preferably six, are provided, which are fitted in a pot 49 formed by a section of the sixth shaft 6 and are arranged on the one hand in a holder 52 of the ring piston 47 formed for example by an abutment 55 and a carrier element 54, and on the other hand in a holder 53 of the claw 45, in order to form an active connection between the ring piston 47 and the claw 45.

At the end of the ring piston 47 remote from the pressure medium inlet are arranged a plurality of piston restoring springs 56, preferably six, each supported against a component of the transmission, for example a circlip 58. Alternatively to the restoring springs, the ring piston 47 can be restored by means of a suitable hydraulic device.

In the unpressurized, disengaged condition of the clutch 18, which is shown in FIG. 8, the ring piston 47 is pressed against the abutment 59 the ring cylinder 50 by the force of the restoring springs 56 and the claw 45 is held axially by the spring-and-ball detent 46, so that the slide blocks have some axial play relative to the ring piston 47 and the claw. Advantageously, the result of this is that no axial forces act upon the slideways, whereby friction losses are minimized. Moreover, friction losses can be minimized still more by an appropriate design of the slide blocks, due to which a hydrodynamic wedge can be produced.

To engage the clutch 18 the ring piston 47 is pushed, by the pressure in the pressure space formed by the ring cylinder 50 and the transmission housing G, against the force of the restoring springs 56, which results in axial movement of the slide blocks 48 and thus of the claw 45, such that when the clutch 18 is engaged, this position is held by the spring-and-ball detent 46. In this case the pot 49 rotates at zero speed.

Figure 10:
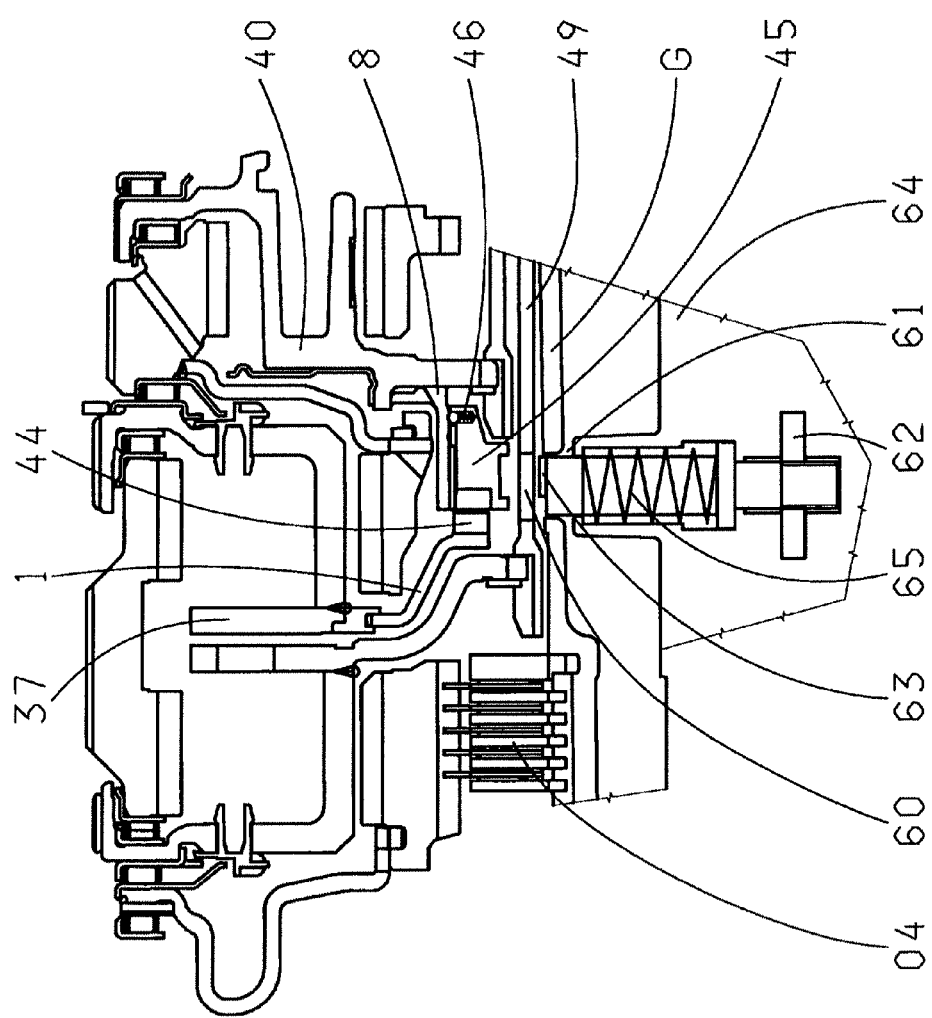
FIG. 10: Schematic view of a further design of the system for actuating the additional shift element in a multi-stage transmission made as in FIG. 5, the shift element being shown in the disengaged condition.
Figure 11:
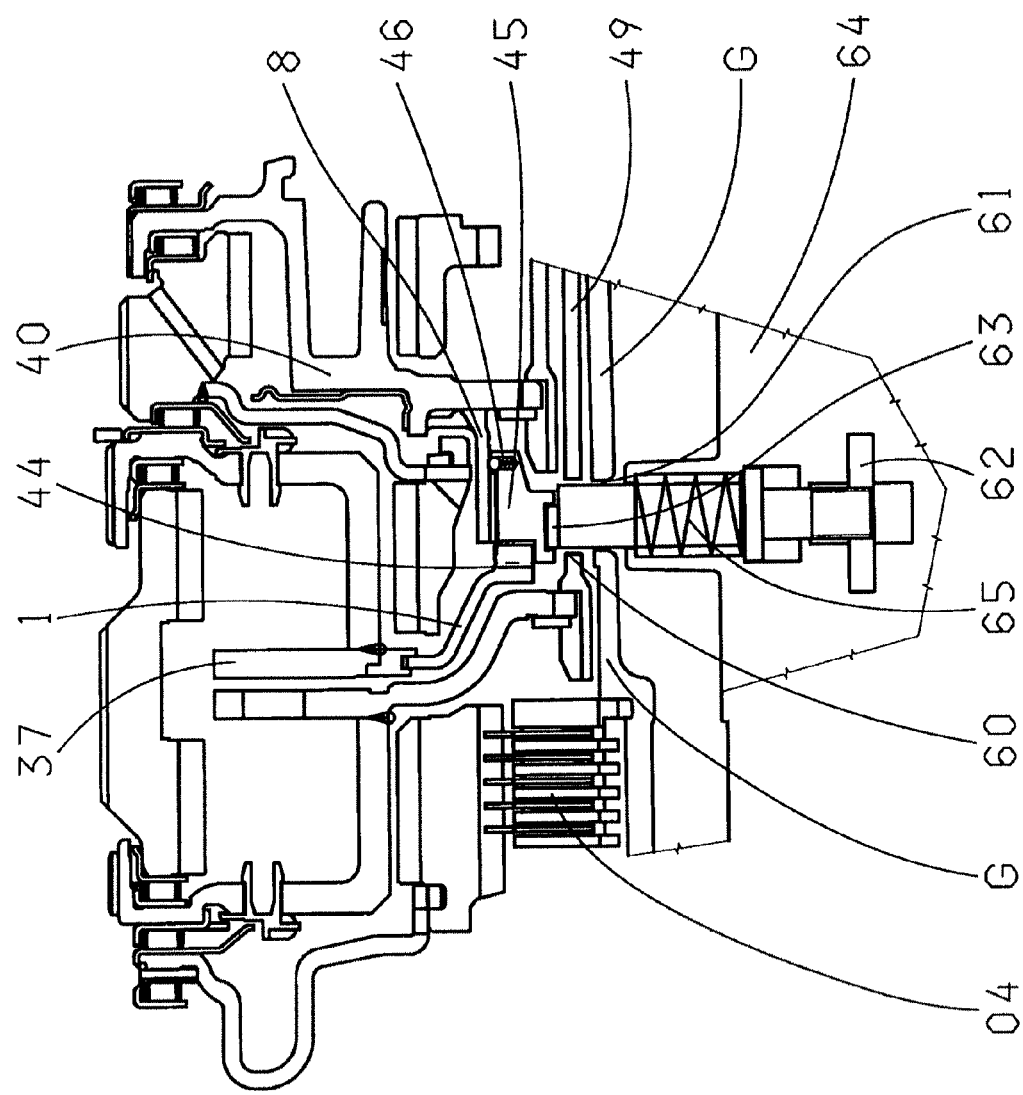
FIG. 11: Schematic view of the design of the system shown in FIG. 10 for actuating the additional shift element, the shift element being shown in the engaged condition.

In a further embodiment of the invention, which is the object of FIGS. 10 and 11, the clutch 18 is made as a claw clutch and can be actuated from the transmission housing by the pot formed by a section of the sixth shaft 6, and to transmit the control movement, rotary/lifting cylinders are provided. FIG. 10 shows the clutch 18 in its disengaged condition and FIG. 11 in its engaged condition.

In this case at least one opening 60 is provided in the circumference of the pot 49 formed by a section of the sixth shaft 6, such that through the respective at least one opening 60 an end of a lifting/rotating cylinder 62 that comprises a rotary cam 63, which passes through a corresponding opening 61 in the transmission housing G, engages when the pot 49 is not moving. Preferably, in the reverse gear and in the first three forward gears the pot rotates at zero speed.

Analogously to the example embodiment shown in FIGS. 8 and 9, a claw 44 of the clutch 18 is associated with the drive input shaft 1 connected in a rotationally fixed manner to the carrier 37 of the second planetary gear set P2, and the other claw 45 is associated with the eighth shaft 8 connected in a rotationally fixed manner to the carrier 40 of the third planetary gear set P3. Further, the claw 45 is arranged so that it can be displaced axially on the eighth shaft 8 and can be held by a spring-and-ball detent device 46 and corresponding retaining grooves in two positions, which correspond to the disengaged and engaged conditions of the clutch 18.

When a rotating/lifting cylinder 62 is actuated by a shifting element 64 it moves against the force of a restoring spring 65 through an opening 60, so that the rotary cam 63 engages in a holder 53 of the claw 45, so that by corresponding rotation of the rotating/lifting cylinder 62 the rotary cam 63 displaces the claw 45 axially in the disengaging or engaging direction, the respective position of the claw 45 then being maintained by the spring-and-ball detent 46. Alternatively to the restoring springs 65, the rotating/lifting cylinder can be restored by means of a suitable hydraulic device.

To actuate the clutch 18, the circumferential position of the pot 49 is adjusted by means of a path sensor system (not shown); alternatively, a detent mechanism can be provided for the pot 49 or for components connected in a rotationally fixed manner to the pot 49.

According to a further embodiment of the invention, which is the object of FIGS. 12, 12A, 13 and 14, the clutch 18 made as a claw clutch can be actuated from the transmission housing by means of the aluminum or stainless steel pot formed by a section of the sixth shaft 6, with the control movement transmitted by electromagnetic induction.

Figure 12:
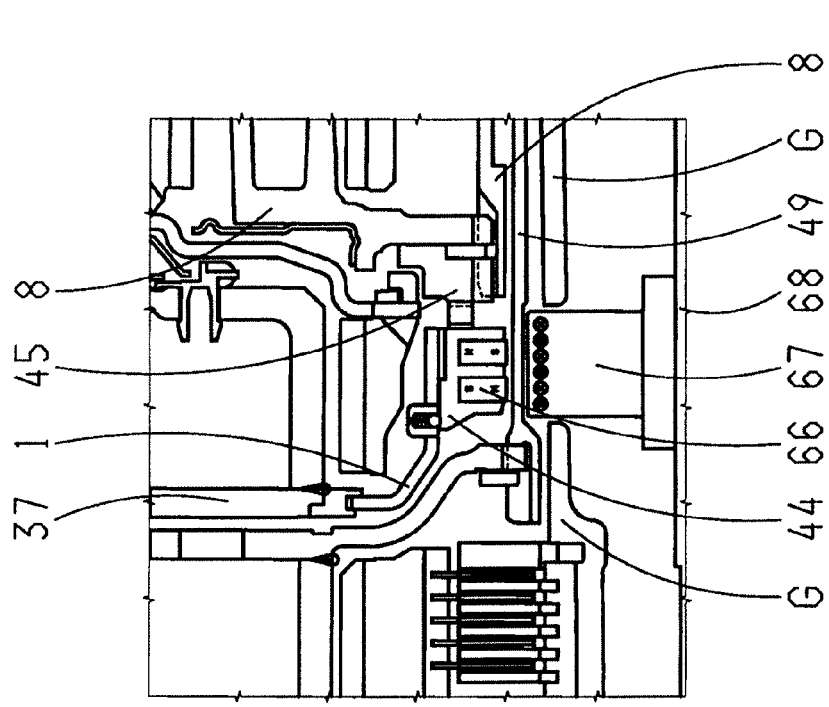
FIG. 12, 12A: Detailed views of a further system for actuating the additional shift element in a multi-stage transmission made as in FIG. 5, in which the control movement is transmitted by electromagnetic induction, the shift element being shown in the disengaged and in the engaged condition.
Figure 12A:
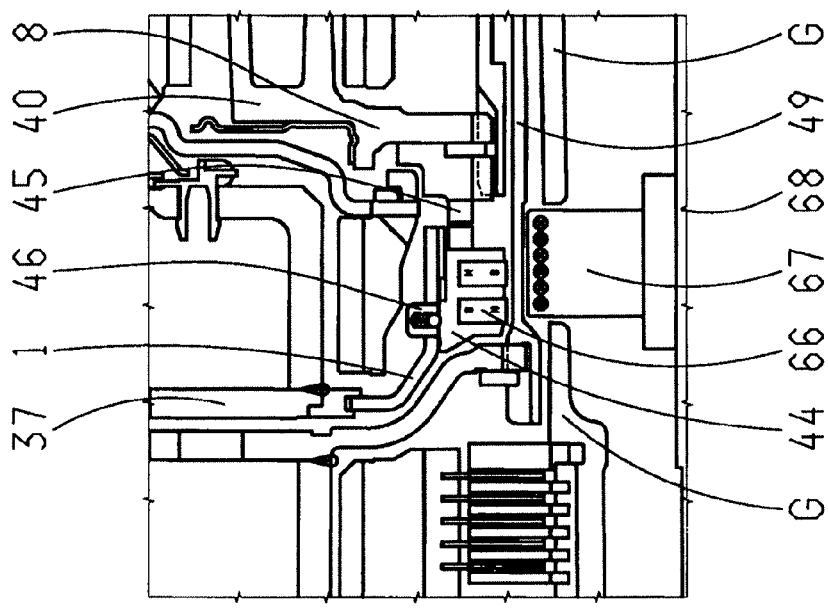
Figure 13:
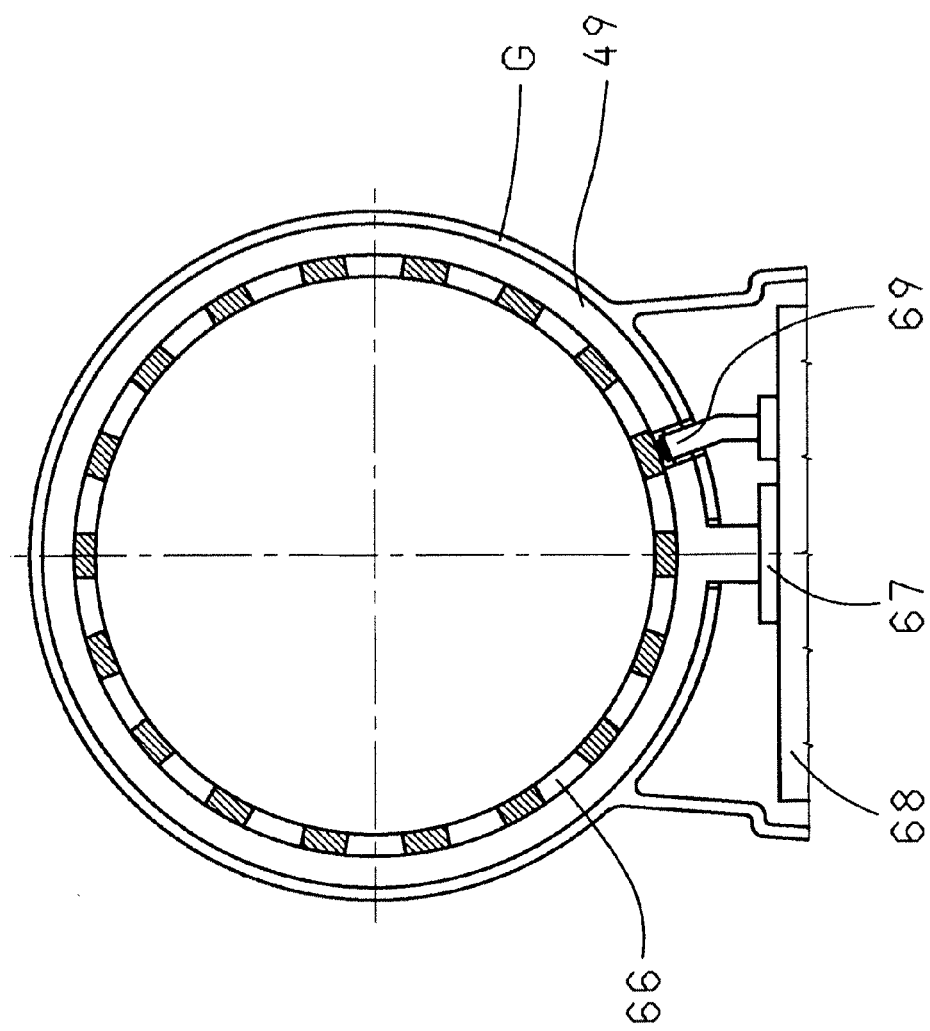
FIG. 13: Detailed view of a system for actuating the additional shift element by electro-magnetic induction, in which the winding of the necessary coil is made as a ring winding close to the shifting unit.

Referring to FIG. 12A the clutch 18 is shown in its disengaged condition and in FIG. 12 it is shown in its engaged condition, the clutch has two claws 44, 45, one claw 44 being associated with the drive input shaft 1 connected in a rotationally fixed manner to the carrier 37 of the second planetary gear set P2 and the other claw 45 with the eighth shaft 8 connected in a rotationally fixed manner to the carrier 40 of the third planetary gear set P3. The claw 44 is arranged to move axially on the drive input shaft 1 and can be held by a spring-and-ball detent device 46 and corresponding retaining grooves in two positions, which correspond to the disengaged and engaged conditions of the clutch 18.

Furthermore, the claw 44 has at least one magnetic ring 66 consisting of permanent magnets. To actuate the clutch 18 a ring coil 67 is provided, which surrounds the magnetic ring 66, the pot 49 being arranged between the coil 67 and the magnetic ring 66. An air gap is provided between the ring coil 67 and the pot 49.

The clutch 18 is actuated when the control unit 68 appropriately energizes the ring coil, so that depending on the magnetic field produced the magnetic ring 66 with the permanent magnets, and thus also the claw 44, are displaced axially in the disengaging or engaging directions of the clutch 18. FIGS. 12, 12A show the connection of the ring coil to the control unit 68; a cross-sectional view of this arrangement is the object of FIG. 13, in which a Hall sensor required for detecting the rotational speed of the magnetic ring 66 is indexed 69.

Figure 14:
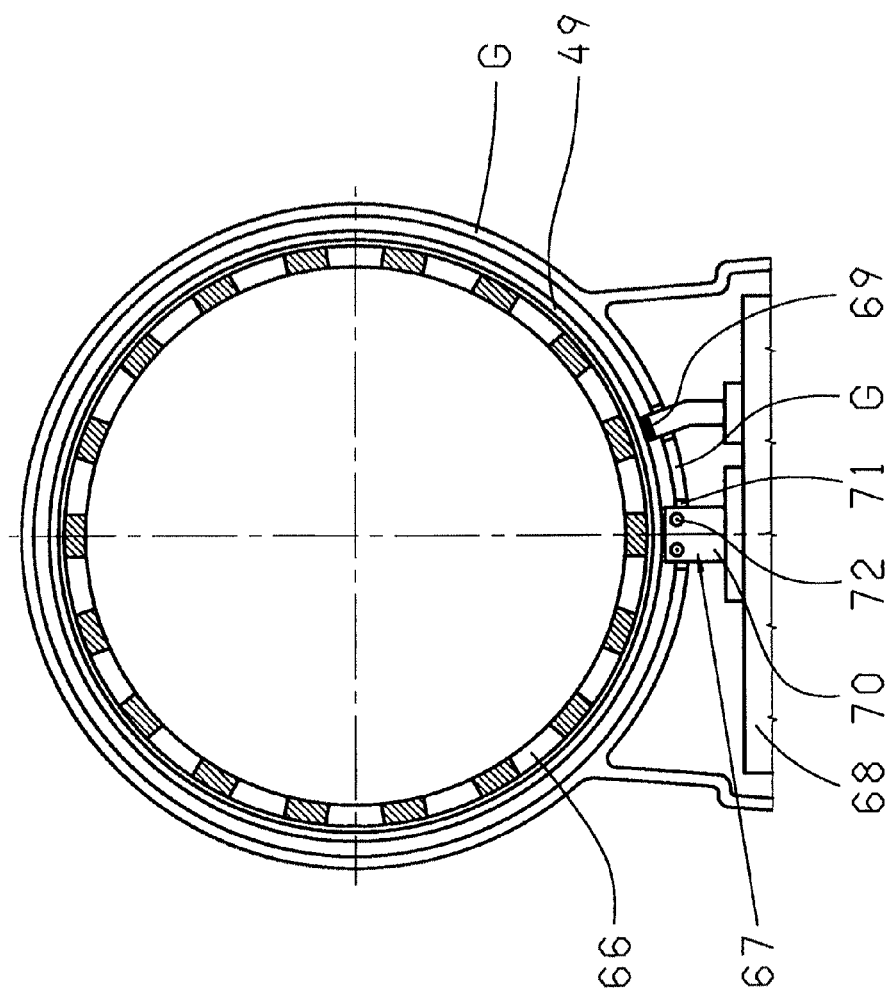
FIG. 14: Detailed view of a system for actuating the additional shift element by electro-magnetic induction, in which the winding of the necessary coil is executed as a winding close to the shifting unit.

According to a design feature of the invention, the coil 67 can be arranged close to the shifting element, as illustrated by the cross-sectional view shown in FIG. 14. In this case at least one preferably cylindrical element 70 is provided, which is directly connected to the shifting element 68 and is adjacent to the pot 49 through an opening 71 in the housing G, and has a magnetic coil 72 which by appropriately energizing, depending on the magnetic field produced, the magnetic ring 66 with its permanent magnets and thus also the claw 44 are displaced axially in the disengaging or engaging direction of the clutch 18. Although the figure shows one element 70, in other embodiments a plurality of elements, for example two or three of them can be provided arranged close to the shifting element.

FIG. 15 shows an example shifting scheme for a multi-stage transmission according to FIG. 1, 2, 3, 4 or 5. For each gear three shift elements are closed. From the shifting scheme, as examples the respective gear ratios i of the individual gear steps and the gear intervals or step intervals phi to the next higher gear, determined therefrom, can be seen; with such a transmission a total of 20 gears can be produced.

From FIG. 15 it can be seen that during sequential shifting double shifts or group shifts are avoided, since two adjacent gear steps always use two shift elements in common. It can also be seen that a large ratio spread is achieved with small gear intervals. Moreover, with the transmission shown in FIG. 15 a total of 20 gears can be produced.

In the example shifting scheme shown in FIG. 15 the fourth clutch 18 is only needed for producing the first forward gear, and is disengaged for the upshift from the first to the second forward gear, which is what enables the clutch to be made as a claw clutch. This reduces the drag torques of the transmission produced because of the small distance between the friction surfaces of a frictional shift element in the disengaged condition and the oil or air-oil mixture held therein.

The first forward gear is obtained by engagement of the fourth clutch 18 and the first and second brakes 03, 04, the second forward gear by engagement of the first and second brakes 03, 04 and the first clutch 15, the third forward gear by engagement of the first and second brakes 03, 04 and the second clutch 57, the fourth forward gear by engagement of the second brake 04 and the first and second clutches 15, 57, the fifth forward gear by engagement of the second brake 04 and the second and third clutches 57, 28, the sixth forward gear by engagement of the second brake 04 and the first and third clutches 15, 28, the seventh forward gear made as a direct gear by engagement of the first, second and third clutches 15, 57, 28, the eighth forward gear by engagement of the first brake 03 and the first and third clutches 15, 28, and the ninth forward gear by engagement of the first brake 03 and the second and third clutches 57, 28. The reversing gear is obtained by engagement of the first and second brakes 03, 04 and the third clutch 28.

Since in both the first forward gear and the reversing gear the first brake 03 and the second brake 04 are engaged, these shift elements (made as frictional or disk shift elements) can be used as starting elements.

According to the invention, even with the same transmission scheme different gear intervals can be obtained depending on the shift logic, so enabling application-specific or vehicle-specific variation.

Figure 16:
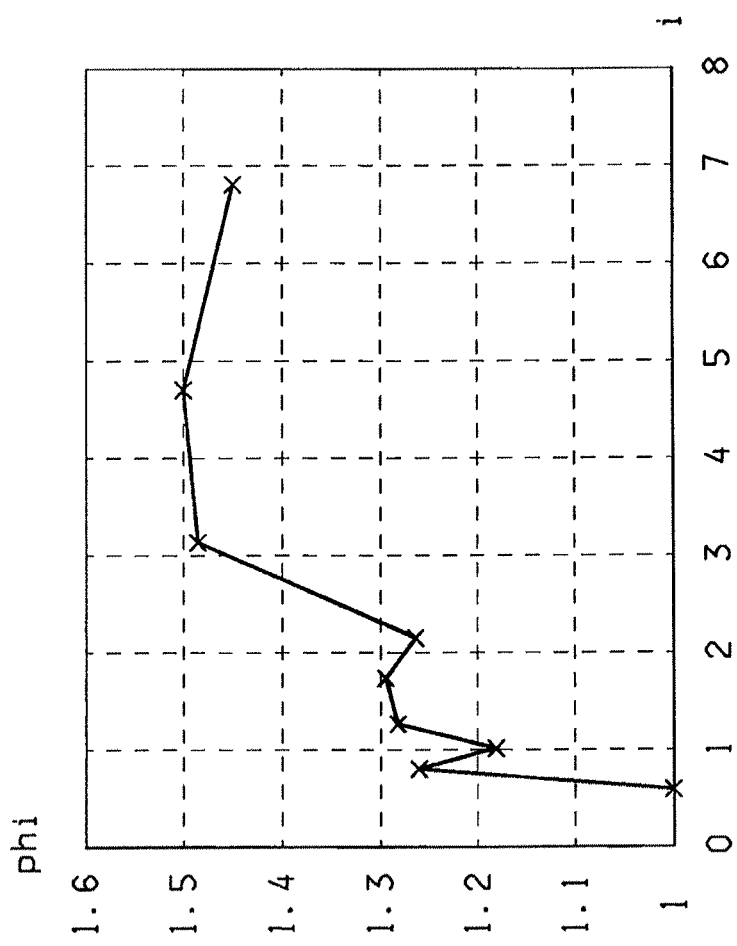
FIG. 16: Diagram showing the step interval corresponding to the respective gear ratios for the values shown in FIG. 15.

A diagram to illustrate the step interval phi that corresponds to the respective gear ratio i of a gear for the transmission shown in FIG. 1, in accordance with the values shown in FIG. 15, is the object of FIG. 16.

According to the invention, additional freewheels can be provided at any suitable point of the multi-stage transmission, for example between a shaft and the housing or if necessary to connect two shafts.

According to the invention, an axle differential and/or a distributor differential can be arranged on the drive input side or on the drive output side.

In an advantageous further development the drive input shaft 1 can if necessary be separated from a drive motor by a clutch element, and for the clutch element a hydrodynamic converter, a hydraulic clutch, a dry starting clutch, a wet starting clutch, a magnetic powder clutch or a centrifugal clutch can be used. It is also possible to arrange a starting element of such type in the force flow direction behind the transmission, and in that case the drive input shaft 1 is permanently connected to the crankshaft of the motor.

The multi-stage transmission according to the invention also enables a torsional oscillation damper to be arranged between the motor and the transmission.

In a further embodiment of the invention (not illustrated), a wear-free brake such as a hydraulic or electric retarder or the like can be arranged on any shaft, preferably on the drive input shaft 1 or the drive output shaft 2, this being particularly important for use in utility vehicles. In addition an auxiliary drive output for driving additional aggregates can be provided on any shaft, preferably on the drive input shaft 1 or the drive output shaft 2.

A further advantage of the multi-stage transmission described herein is that an electric machine can be attached to any shaft as a generator and/or as an additional drive machine.

Of course, any design configurations and in particular any spatial arrangements of the planetary gear sets and shift elements, in their own right as well as relative to one another and provided that they are technically appropriate, fall under the protective scope of the present claims, without influencing the function of the transmission as indicated in the claims, even though such configurations may not be represented explicitly in the figures or in the description.

INDEXES

1 First shaft, drive input shaft
2 Second shaft, drive output shaft
3 Third shaft
4 Fourth shaft 5 Fifth shaft
6 Sixth shaft
7 Seventh shaft
8 Eighth shaft
03 First brake
04 Second brake
15 First clutch
18 Fourth clutch
28 Third clutch
30 Sliding teeth
31 Restoring spring
32 Shifting unit
33 Intermediate plate
34 Guide wheel shaft
35 Sun gear shaft
36 Sun gear
37 Carrier
38 Longitudinal groove
39 Bore
40 Carrier
41 Piston
43 O-ring seal
43 O-ring seal
44 Claw
45 Claw
46 Spring-and-ball detent device
47 Ring piston
48 Slide block
49 Pot
50 Ring cylinder
51 Bore
52 Holder
53 Holder
54 Carrier
55 Abutment
56 Piston restoring spring
57 Second clutch
58 Circlip
59 Abutment
60 Opening
61 Opening
62 Lifting/rotating cylinder
63 Rotary cam
64 Shifting unit
65 Restoring spring
66 Magnetic ring
67 Ring coil
68 Control unit
69 Hall sensor
70 Cylindrical element
71 Opening
72 Magnetic coil
P1 First planetary gear set
P2 Second planetary gear set
P3 Third planetary gear set
P4 Fourth planetary gear set
i Gear ratio
phi Gear interval
G Housing
eta Efficiency
A Outer disk carrier of the clutch 18
I Inner disk carrier of the clutch 18
S Servomechanism of the clutch 18

The invention claimed is:

1. A multi-stage transmission of planetary design for a motor vehicle, the transmission comprising:
a drive input shaft (1) and a drive output shaft (2);
first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;
at least third, fourth, fifth, sixth, seventh and eighth rotating shafts (3, 4, 5, 6, 7, 8);
six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;
the sun gear of the first planetary gearset (P1) being connected to the third shaft (3) which is connectable, via the first brake (03), to the housing (G) of the transmission and is connected in a rotationally fixed manner to the sun gear of the second planetary gearset (P2);
the carrier of the first planetary gearset (P1) being connected to the sixth shaft (6) which is connected to the ring gear of the fourth planetary gearset (P4);
the ring gear of the first planetary gearset (P1) being connectable, via the second brake (04), to the housing (G) of the transmission;
the carrier of the second planetary gearset (P2) being connected to the drive input shaft (1) which is connectable to the fifth shaft (5) by the first clutch (15);
the fifth shaft (5) being connected to the sun gear of the fourth planetary gearset (P4) and the ring gear of the third planetary gearset (P3) and being connectable to the seventh shaft (7) by the second clutch (57);
the seventh shaft (7) being connected to the sun gear of the third planetary gearset (P3) and the ring gear of the second planetary gearset (P2);
the drive output shaft (2) being connected to the carrier of the fourth planetary gearset (P4) and connectable, via the third clutch (28), to the eighth shaft (8) which is connected to the carrier of the third planetary gearset (P3);
the eighth shaft (8) being connectable, via the fourth clutch (18), to the drive input shaft (1), and the fourth clutch (18) being a disk clutch and axially arranged between the first planetary gearset (P1) and the second planetary gearset (P2);
the fourth clutch (18) comprising an inner disk carrier (A), that is formed by the eighth shaft (8), and an outer disk carrier (A) that is connected to the carrier of the second planetary gearset (P2); and
a servomechanism (S), associated with the fourth clutch (18), being arranged inside a cylindrical space formed by the outer disk carrier (A) directly adjacent to the carrier of the second planetary gearset (P2) and between the first and the second planetary gearsets (P1, P2), and the servomechanism (S) rotating at approximately a same rotational speed as the drive input shaft (1).

2. The multi-stage transmission according to claim 1, wherein a pressure medium is supplied to the servomechanism (S) associated with the fourth clutch (18) via a bore in the carrier of the second planetary gearset (P2) and a bore in the drive input shaft (1) which is connected in a rotationally fixed manner to the carrier of the second planetary gearset (P2).

3. A multi-stage transmission of planetary design for a motor vehicle, the transmission comprising:
- a drive input shaft (1) and a drive output shaft (2);
- first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;
- at least third, fourth, fifth, sixth, seventh and eighth rotating shafts (3, 4, 5, 6, 7, 8);
- six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;
- the sun gear of the first planetary gearset (P1) being connected to the third shaft (3) which is connectable, via the first brake (03), to the housing (G) of the transmission and is connected in a rotationally fixed manner to the sun gear of the second planetary gearset (P2);
- the carrier of the first planetary gearset (P1) being connected to the sixth shaft (6) which is connected to the ring gear of the fourth planetary gearset (P4);
- the ring gear of the first planetary gearset (P1) being connectable, via the second brake (04), to the housing (G) of the transmission;
- the carrier of the second planetary gearset (P2) being connected to the drive input shaft (1) which is connectable to the fifth shaft (5) by the first clutch (15);
- the fifth shaft (5) being connected to the sun gear of the fourth planetary gearset (P4) and the ring gear of the third planetary gearset (P3) and being connectable to the seventh shaft (7) by the second clutch (57);
- the seventh shaft (7) being connected to the sun gear of the third planetary gearset (P3) and the ring gear of the second planetary gearset (P2);
- the drive output shaft (2) being connected to the carrier of the fourth planetary gearset (P4) and connectable, via the third clutch (28), to the eighth shaft (8) which is connected to the carrier of the third planetary gearset (P3);
- the eighth shaft (8) being connectable, via the fourth clutch (18), to the drive input shaft (1), the fourth clutch (18) being a disk clutch axially arranged between the first planetary gearset (P1) and the second planetary gearset (P2);
- the fourth clutch (18) comprises an inner disk carrier (I), that is formed by a section of the eighth shaft (8), and an outer disk carrier (A) that is connected to the carrier of the second planetary gearset (P2); and
- a servomechanism (S), associated with the fourth clutch (18), rotating at approximately a same speed as the drive input shaft (1) and being arranged in a cylindrical space formed by the outer disk carrier (A) and axially between the first planetary gearset (P1) and the second planetary gearset (P2), and a pressure medium is supplied to the servomechanism (S) via a bore in the third shaft (3).

4. A multi-stage transmission of planetary design for a motor vehicle, the transmission comprising:
- a drive input shaft (1) and a drive output shaft (2);
- first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;
- at least third, fourth, fifth, sixth, seventh and eighth rotating shafts (3, 4, 5, 6, 7, 8);
- six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;
- the sun gear of the first planetary gearset (P1) being connected to the third shaft (3) which is connectable, via the first brake (03), to the housing (G) of the transmission and being connected in a rotationally fixed manner to the sun gear of the second planetary gearset (P2);
- the carrier of the first planetary gearset (P1) being connected to the sixth shaft (6) which is connected to the ring gear of the fourth planetary gearset (P4);
- the ring gear of the first planetary gearset (P1) being connectable, via the second brake (04), to the housing (G) of the transmission;
- the carrier of the second planetary gearset (P2) being connected to the drive input shaft (1) which is connectable to the fifth shaft (5) by the first clutch (15);
- the fifth shaft (5) being connected to the sun gear of the fourth planetary gearset (P4) and the ring gear of the third planetary gearset (P3) and being connectable to the seventh shaft (7) by the second clutch (57);
- the seventh shaft (7) being connected to the sun gear of the third planetary gearset (P3) and the ring gear of the second planetary gearset (P2);
- the drive output shaft (2) being connected to the carrier of the fourth planetary gearset (P4) and connectable, via the third clutch (28), to the eighth shaft (8) which is connected to the carrier of the third planetary gearset (P3);
- the eighth shaft (8) being connectable, via the fourth clutch (18), to the drive input shaft (1), and the fourth clutch (18) being arranged axially between the first planetary gearset (P1) and the second planetary gearset (P2);
- the fourth clutch (18), comprising an inner disk carrier (I) of the fourth clutch, forms a section of the drive input shaft (1) and an outer disk carrier (A) being connected to the carrier of the third planetary gearset (P3);
- a servomechanism (S), associated with the fourth clutch (18), being arranged axially between the second planetary gearset (P2) and the third planetary gearset (P3) and rotating at approximately a same speed as the eighth shaft (8), and pressure medium being supplied to the servomechanism (S) via a bore in the drive input shaft (1) and in the seventh shaft (7).

5. A multi-stage transmission of planetary design for a motor vehicle, the transmission comprising:
- a drive input shaft (1) and a drive output shaft (2);
- first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;
- at least third, fourth, fifth, sixth, seventh and eighth rotating shafts (3, 4, 5, 6, 7, 8);
- six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;
- the sun gear of the first planetary gearset (P1) being connected to the third shaft (3) which is connectable, via the first brake (03), to the housing (G) of the transmission and being connected in a rotationally fixed manner to the sun gear of the second planetary gearset (P2);

the carrier of the first planetary gearset (P1) being connected to the sixth shaft (6) which is connected to the ring gear of the fourth planetary gearset (P4);

the ring gear of the first planetary gearset (P1) being connectable, via the second brake (04), to the housing (G) of the transmission;

the carrier of the second planetary gearset (P2) being connected to the drive input shaft (1) which is connectable to the fifth shaft (5) by the first clutch (15);

the fifth shaft (5) being connected to the sun gear of the fourth planetary gearset (P4) and the ring gear of the third planetary gearset (P3) and being connectable to the seventh shaft (7) by the second clutch (57);

the seventh shaft (7) being connected to the sun gear of the third planetary gearset (P3) and the ring gear of the second planetary gearset (P2);

the drive output shaft (2) being connected to the carrier of the fourth planetary gearset (P4) and connectable, via the third clutch (28), to the eighth shaft (8) which is connected to the carrier of the third planetary gearset (P3);

the eighth shaft (8) being connectable, via the fourth clutch (18), to the drive input shaft (1), and the fourth clutch (18) being a disk clutch axially arranged between the second planetary gearset (P2) and the third planetary gearset (P3) such that a section of an inner disk carrier (I) of the fourth clutch (18) radially extends above the second planetary gearset (P2); and a servomechanism (S), associated with the fourth clutch (18), being arranged axially between the second planetary gearset (P2) and the third planetary gearset (P3), the servomechanism (S) rotating at approximately a same speed the eighth shaft (8), and pressure medium being supplied to the servomechanism (S) via a bore in the drive input shaft (1) and the seventh shaft (7).

6. A multi-stage transmission of planetary design for a motor vehicle, the transmission comprising:

a drive input shaft (1) and a drive output shaft (2);

first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;

at least third, fourth, fifth, sixth, seventh and eighth rotating shafts (3, 4, 5, 6, 7, 8);

six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;

the sun gear of the first planetary gearset (P1) being connected to the third shaft (3) which is connectable, via the first brake (03), to the housing (G) of the transmission and being connected in a rotationally fixed manner to the sun gear of the second planetary gearset (P2);

the carrier of the first planetary gearset (P1) being connected to the sixth shaft (6) which is connected to the ring gear of the fourth planetary gearset (P4);

the ring gear of the first planetary gearset (P1) being connectable, via the second brake (04), to the housing (G) of the transmission;

the carrier of the second planetary gearset (P2) being connected to the drive input shaft (1) which is connectable to the fifth shaft (5) by the first clutch (15);

the fifth shaft (5) being connected to the sun gear of the fourth planetary gearset (P4) and the ring gear of the third planetary gearset (P3) and being connectable to the seventh shaft (7) by the second clutch (57);

the seventh shaft (7) being connected to the sun gear of the third planetary gearset (P3) and the ring gear of the second planetary gearset (P2);

the drive output shaft (2) being connected to the carrier of the fourth planetary gearset (P4) and being connectable, via the third clutch (28), to the eighth shaft (8) which is connected to the carrier of the third planetary gearset (P3);

the eighth shaft (8) being connectable, via the fourth clutch (18), to the drive input shaft (1), the fourth clutch (18) is disengaged exclusively during upshifts, the fourth clutch (18) being a hydraulically actuated claw clutch and being arranged adjacent the second planetary gearset (P2) and axially between the first planetary gearset (P1) and the third planetary gearset (P3); and a pressure medium being supplied, through transmission rolls, to the fourth clutch (18) comprising shifting teeth (30), a piston (41) and at least one of a piston restoring spring (31) and a hydraulic device serving for restoring the piston.

7. The multi-stage transmission according to claim 6, wherein the pressure medium is supplied via a shifting device (32), an intermediate plate (33), a guide wheel shaft (34), a sun gear shaft (35), the sun gear (36) of the second planetary gearset (P2) and the carrier of the second planetary gearset (P2), and the pressure medium flows into the sun gear shaft (35) via bores (39) and longitudinal grooves (38).

8. The multi-stage transmission according to claim 7, wherein a rectangular-ring seal is provided between the sun gear shaft (35) and the intermediate plate (33), between the guide wheel shaft (34) and the drive input shaft (1) and between the sun gear (36) and the carrier (37) of the second planetary gearset (P2), and an O-ring seal (42, 43) is provided on the piston (41) and between the sun gear shaft (35) and the sun gear (36).

9. A multi-stage transmission of planetary design for a motor vehicle, the transmission comprising:

a drive input shaft (1) and a drive output shaft (2);

first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;

at least third, fourth, fifth, sixth, seventh and eighth rotating shafts (3, 4, 5, 6, 7, 8);

six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2), such that nine forward gears and one reverse gear can be achieved;

the sun gear of the first planetary gearset (P1) being connected to the third shaft (3) which is connectable, via the first brake (03), to the housing (G) of the transmission and being connected in a rotationally fixed manner to the sun gear of the second planetary gearset (P2);

the carrier of the first planetary gearset (P1) being connected to the sixth shaft (6) which is connected to the ring gear of the fourth planetary gearset (P4);

the ring gear of the first planetary gearset (P1) being connectable, via the second brake (04), to the housing (G) of the transmission;

the carrier of the second planetary gearset (P2) being connected to the drive input shaft (1) which is connectable to the fifth shaft (5) by the first clutch (15);

the fifth shaft (5) being connected to the sun gear of the fourth planetary gearset (P4) and the ring gear of the third planetary gearset (P3) and being connectable to the seventh shaft (7) by the second clutch (57);

the seventh shaft (7) being connected to the sun gear of the third planetary gearset (P3) and the ring gear of the second planetary gearset (P2);

the drive output shaft (2) being connected to the carrier of the fourth planetary gearset (P4) and being connectable, via the third clutch (28), to the eighth shaft (8) which is connected to the carrier of the third planetary gearset (P3);

the eighth shaft (8) being connectable, via the fourth clutch (18), to the drive input shaft (1), and when the fourth clutch (18) is disengaged exclusively during upshifts, the fourth clutch (18) being a hydraulically actuated claw clutch and being arranged adjacent the second planetary gearset (P2) and axially between the first planetary gearset (P1) and the third planetary gearset (P3); and the fourth clutch (18) being actuated from the housing (G) by a pot (49) formed by a section of the sixth shaft (6), and a control movement taking place on the claw clutch (18) by slide blocks (48) fitted in the pot (49), which are in active connection with the piston (47), for actuating the clutch (18), and an axially displaceable claw (45) of the clutch (18).

10. The multi-stage transmission according to claim 9, wherein the fourth clutch (18) comprises first and second claws (44, 45), the first claw (44) being associated with the drive input shaft (1), which is connected in a rotationally fixed manner to the carrier (37) of the second planetary gearset (P2), and the second claw (45) being associated with the eighth shaft (8), which is connected, in a rotationally fixed manner, to the carrier (40) of the third planetary gearset (P3), the second claw (45) is axially movable on the eighth shaft (8) and is retainable by a spring-and-ball detent device (46) and corresponding retaining grooves in two positions which correspond to disengaged and engaged conditions of the fourth clutch (18), and an axially displaceable ring piston (47) actuating the fourth clutch (18) and comprising a pressure space being is formed by a ring cylinder (50) and the transmission housing (G), a bore (51) in the transmission housing (G) supplying pressure medium such that to transmit control movement of the ring piston (47) a plurality of slide blocks (48) are fitted inside the pot (49) and arranged in a holder (52) of the ring piston (47) and in a holder (53) of the claw (45) to form an active connection between the ring piston (47) and the claw (45), and a plurality of piston restoring springs (56) being arranged and each supported against a component of the transmission at an end of the ring piston (47) remote from a pressure medium inlet.

11. The multi-stage transmission according to claim 10, wherein alternatively to the restoring springs (56), the ring piston (47) is restored by means of a suitable hydraulic device.

12. A multi-stage transmission of planetary design for a motor vehicle, the transmission comprising:

a drive input shaft (1) and a drive output shaft (2);

first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;

at least third, fourth, fifth, sixth, seventh and eighth rotating shafts (3, 4, 5, 6, 7, 8);

six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;

the sun gear of the first planetary gearset (P1) being connected to the third shaft (3) which is connectable, via the first brake (03), to the housing (G) of the transmission and being connected in a rotationally fixed manner to the sun gear of the second planetary gearset (P2);

the carrier of the first planetary gearset (P1) being connected to the sixth shaft (6) which is connected to the ring gear of the fourth planetary gearset (P4);

the ring gear of the first planetary gearset (P1) being connectable, via the second brake (04), to the housing (G) of the transmission;

the carrier of the second planetary gearset (P2) being connected to the drive input shaft (1) which is connectable to the fifth shaft (5) by the first clutch (15);

the fifth shaft (5) being connected to the sun gear of the fourth planetary gearset (P4) and the ring gear of the third planetary gearset (P3) and being connectable to the seventh shaft (7) by the second clutch (57);

the seventh shaft (7) being connected to the sun gear of the third planetary gearset (P3) and the ring gear of the second planetary gearset (P2);

the drive output shaft (2) being connected to the carrier of the fourth planetary gearset (P4) and being connectable, via the third clutch (28), to the eighth shaft (8) which is connected to the carrier of the third planetary gearset (P3);

the eighth shaft (8) being connectable, via the fourth clutch (18), to the drive input shaft (1), and when the fourth clutch (18) is disengaged exclusively during upshifts, the fourth clutch (18) is a hydraulically actuated claw clutch and being arranged adjacent the second planetary gearset and axially between the first planetary gearset (P1) and the third planetary gearset (P3) clutch (18) being actuated from the transmission housing (G) by a pot (49) formed by a section of the sixth shaft (6), the fourth clutch (18) having a first claw (44) associated with the drive input shaft (1) which is connected in a rotationally fixed manner to the carrier (37) of the second planetary gear set (P2) and a second claw (45) associated with the eighth shaft (8) which is connected in a rotationally fixed manner to the carrier (40) of the third planetary gear set (P3), the second claw (45) being arranged axially movably on the eighth shaft (8) and being retainable by a spring-and-ball detent device (46) and corresponding retaining grooves in two positions which correspond to disengaged and engaged conditions of the fourth clutch (18), and control movement being transmittable to the claw clutch (18) by at least one rotating/lifting cylinder (62), the circumference of the pot (49) having at least one opening (60) through which, respectively, an end of a lifting/rotating cylinder (62), that passes through a corresponding opening (61) in the transmission housing (G) and comprises a rotary cam (63), engages when the pot (49) is at rest such that when a rotating/lifting cylinder (62) is actuated, the rotating/lifting cylinder (62) engages, against a force of a restoring spring (65), through an opening (60) in a holder (53) of the second claw (45), such that by corresponding rotation of the rotating/lifting cylinder (62), the rotary cam (63) moves the second claw (45) axially in either the condition corresponding to the disengaging or the engaging condition of the fourth clutch (18).

13. The multi-stage transmission according to claim 12, wherein alternatively to the restoring spring (65), a rotating/lifting cylinder (62) is restorable by a suitable hydraulic device.

14. The multi-stage transmission according to claim 12, wherein one of a path sensor system, a detent means for the pot (49) and components connected in a rotationally fixed manner to the pot (49) adjust a circumferential position of the pot (49) to actuate the fourth clutch (18).

15. A multi-stage transmission of planetary design for a motor vehicle, the transmission comprising:
a drive input shaft (1) and a drive output shaft (2);
first, second, third and fourth planetary gearsets (P1, P2, P3, P4) arranged in a housing (G), each of the first, the second, the third and the fourth planetary gearsets (P1, P2, P3, P4) comprising a sun gear, a carrier and a ring gear;
at least third, fourth, fifth, sixth, seventh and eighth rotating shafts (3, 4, 5, 6, 7, 8);
six shift elements (03, 04, 15, 28, 57, 18) comprising first and second brakes (03, 04) and first, second, third and fourth clutches (15, 28, 57, 18) whose selective engagement produces various gear ratios between the drive input shaft (1) and the drive output shaft (2) such that nine forward gears and one reverse gear can be achieved;
the sun gear of the first planetary gearset (P1) being connected to the third shaft (3) which is connectable, via the first brake (03), to the housing (G) of the transmission and being connected in a rotationally fixed manner to the sun gear of the second planetary gearset (P2);
the carrier of the first planetary gearset (P1) being connected to the sixth shaft (6) which is connected to the ring gear of the fourth planetary gearset (P4);
the ring gear of the first planetary gearset (P1) being connectable, via the second brake (04), to the housing (G) of the transmission;
the carrier of the second planetary gearset (P2) being connected to the drive input shaft (1) which is connectable to the fifth shaft (5) by the first clutch (15);
the fifth shaft (5) being connected to the sun gear of the fourth planetary gearset (P4) and the ring gear of the third planetary gearset (P3) and being connectable to the seventh shaft (7) by the second clutch (57);
the seventh shaft (7) being connected to the sun gear of the third planetary gearset (P3) and the ring gear of the second planetary gearset (P2);
the drive output shaft (2) being connected to the carrier of the fourth planetary gearset (P4) and being connectable, via the third clutch (28), to the eighth shaft (8) which is connected to the carrier of the third planetary gearset (P3); and
the eighth shaft (8) being connectable, via the fourth clutch (18), to the drive input shaft (1), and when the fourth clutch (18) is disengaged exclusively during upshifts, the fourth clutch (18) being an electromagnetically actuated claw clutch and being arranged adjacent the second planetary gearset (P2) and axially between the first planetary gearset (P1) and the third planetary gearset (P3) the fourth clutch (18) being actuated from the transmission housing (G) by a pot (49) formed by a section of the sixth shaft (6) and such actuation occurring by electromagnetic induction.

16. The multi-stage transmission according to claim 15, wherein the fourth clutch (18) comprises first and second claws (44, 45), the first claw (44) is associated with the drive input shaft (1) which is connected in a rotationally fixed manner to the carrier (37) of the second planetary gearset (P2) and the second claw (45) is associated with the eighth shaft (8) which is connected in a rotationally fixed manner to the carrier (40) of the third planetary gearset (P3), the second claw (45) is axially movable on the eighth shaft (8) and retainable by a spring-and-ball detent device (46) and corresponding retaining grooves in two positions which correspond to disengaged and engaged conditions of the fourth clutch (18), the first claw (44) comprises at least one magnetic ring (66) comprising permanent magnets and, in order to actuate the fourth clutch (18), a ring coil (67) is provided which surrounds the magnetic ring (66), with the pot (49) arranged between the ring coil (67) and the magnetic ring (66), such that the fourth clutch (18) is actuated by correspondingly energizing the ring coil (67) via the control unit (68) such that, as a function of a magnetic field produced the magnetic ring (66) with the permanent magnets and hence also the first claw (44), are moved to a position which corresponds to either the disengaged condition or the engaged condition of the clutch (18).

17. The multi-stage transmission according to claim 15, wherein the fourth clutch (18) comprises first and second claws (44, 45), the first claw (44) is associated with the drive input shaft (1) which is connected in a rotationally fixed manner to the carrier (37) of the second planetary gearset (P2) and the second claw (45) is associated with the eighth shaft (8) which is connected in a rotationally fixed manner to the carrier (40) of the third planetary gearset (P3), the second claw (45) is axially movable on the eighth shaft (8) and is retainable by a spring-and-ball detent device (46) and corresponding retaining grooves in two positions which correspond to disengaged and engaged conditions of the fourth clutch (18), such that the first claw (44) comprises at least one magnetic ring (66) comprising permanent magnets and, at least one element (70) is provided, which is connected directly with a shifting unit (68) and is adjacent to the pot (49) through an opening in the housing (G) and comprises a magnetic coil (72), such that when the magnetic coil (72) is energized appropriately, as a function of magnetic field produced the magnetic ring (66) comprising the permanent magnets, and therefore also the first claw (44), is axially moved to the position which corresponds to either the disengaged or the engaged condition of the clutch (18).

18. The multi-stage transmission according to claim 6, wherein the first, the second, the third and the fourth planetary gearsets (P1, P2, P3, P4) are minus planetary gearsets.

19. The multi-stage transmission according to claim 6, wherein the first, the second, the third and the fourth planetary gearsets (P1, P2, P3, P4) are axially arranged in a sequentially order of the first planetary gearset (P1), the second planetary gearset (P2), the third planetary gearset (P3), and the fourth planetary gearset (P4).

20. The multi-stage transmission according to claim 6, wherein a first forward gear is implemented by engagement of the fourth clutch (18) and the first and the second brakes (03, 04),
a second forward gear is implemented by engagement of the first and the second brakes (03, 04) and the first clutch (15), a third forward gear is implemented by engagement of the first and the second brakes (03, 04) and the second clutch (57), a fourth forward gear is implemented by engagement of the second brake (04) and the first and the second clutches (15, 57), a fifth forward gear is implemented by engagement of the second brake (04) and the second and the third clutches (57, 28), a sixth forward gear is implemented by engagement of the second brake (04) and the first and the third clutches (15, 28), a seventh forward gear is implemented by engagement of the first, the second and the third clutches (15, 57, 28), an eighth forward gear is implemented by engagement of the first brake (03) and the first and the third clutches (15, 28), a ninth forward gear is implemented by engagement of the first brake (03) and the second and the third clutches (57, 28), and the reverse gear is implemented by engagement of the first and the second brakes (03, 04) and the third clutch (28).

21. The multi-stage transmission according to claim 6, wherein starting occurs by engagement of at least one of the first and the second brakes (03, 04) of the transmission.

* * * * *